US012118475B2

United States Patent
Pour et al.

(10) Patent No.: US 12,118,475 B2
(45) Date of Patent: Oct. 15, 2024

(54) COMPUTER MODELING FOR DETECTION OF DISCONTINUITIES AND REMEDIAL ACTIONS IN FASTENING SYSTEMS

(71) Applicant: NEWFREY LLC, New Britain, CT (US)

(72) Inventors: Amir Reza Kashani Pour, New Britain, CT (US); Maxim Dalton, New Britain, CT (US)

(73) Assignee: NEWFREY LLC, New Britain, CT (US)

( * ) Notice: Subject to any disclaimer, the term of this patent is extended or adjusted under 35 U.S.C. 154(b) by 0 days.

(21) Appl. No.: 17/734,891

(22) Filed: May 2, 2022

(65) Prior Publication Data

US 2022/0261663 A1    Aug. 18, 2022

Related U.S. Application Data

(63) Continuation of application No. 17/717,795, filed on Apr. 11, 2022, now abandoned.
(Continued)

(51) Int. Cl.
*G06N 5/022* (2023.01)
*B23K 31/12* (2006.01)

(52) U.S. Cl.
CPC ............ *G06N 5/022* (2013.01); *B23K 31/125* (2013.01)

(58) Field of Classification Search
CPC .... G06N 5/022; B23K 31/125; B23K 9/0953; B23K 31/006
See application file for complete search history.

(56) References Cited

U.S. PATENT DOCUMENTS 5,283,418 A * 2/1994 Bellows ............... B23K 31/006
219/130.01
6,583,386 B1    6/2003 Ivkovich
(Continued)

FOREIGN PATENT DOCUMENTS

CN          110842392 A1    2/2020
DE     10 2016 209 640 A1   12/2017
(Continued)

OTHER PUBLICATIONS

Zhang Y, Wang Q, Liu Y. Adaptive intelligent welding manufacturing. Weld J. Jan. 2021; 100(1):63-83. (Year: 2021).*
(Continued)

*Primary Examiner* — Oluwatosin Alabi
(74) *Attorney, Agent, or Firm* — FOLEY & LARDNER LLP

(57) ABSTRACT

Disclosed herein are systems and methods for identifying welding anomalies and discontinuities in stud welding using AI models. Instead of conventional welding accuracy methods (e.g. destructive and/or image generation methods) a processor may communicate with one or more sensors associated with a joining machine to retrieve joining data and attributes. The processor may then execute an AI model that is trained based on previously performed stud welding, their corresponding welding attributes, and their corresponding discontinuities and/or anomalies. The processor may execute the AI model using data retrieved from the sensors and may calculate a likelihood of a discontinuity and discontinuity attributes, such as, location, depth, and the like. The processor may also execute a second AI model to identify an appropriate course of action to remedy the identified/predicted discontinuity.

20 Claims, 22 Drawing Sheets

Related U.S. Application Data

(60) Provisional application No. 63/173,841, filed on Apr. 12, 2021.

(56) References Cited

U.S. PATENT DOCUMENTS

| | | | | |
|---|---|---|---|---|
| 6,857,553 | B1* | 2/2005 | Hartman | G01N 29/46 |
| | | | | 228/103 |
| 7,009,144 | B2 | 3/2006 | Schmidt et al. | |
| 7,359,821 | B1* | 4/2008 | Smith | G01L 5/0052 |
| | | | | 702/113 |
| 8,395,072 | B2 | 3/2013 | Suzuki et al. | |
| 10,036,731 | B2 | 7/2018 | Edwards et al. | |
| 10,317,853 | B2 | 6/2019 | Inagaki et al. | |
| 10,417,934 | B2* | 9/2019 | Becker | B23K 9/126 |
| 2003/0000931 | A1* | 1/2003 | Ueda | B23K 9/126 |
| | | | | 219/124.34 |
| 2009/0200281 | A1 | 8/2009 | Hampton | |
| 2009/0200282 | A1 | 8/2009 | Hampton | |
| 2011/0097595 | A1* | 4/2011 | Takeda | B23K 9/007 |
| | | | | 228/101 |
| 2013/0044945 | A1* | 2/2013 | Nykyforov | G06V 20/62 |
| | | | | 382/165 |
| 2013/0299475 | A1* | 11/2013 | Aoki | B23K 9/0216 |
| | | | | 219/124.03 |
| 2017/0032281 | A1* | 2/2017 | Hsu | G05B 19/41875 |
| 2017/0036288 | A1* | 2/2017 | Albrecht | B23K 31/125 |
| 2018/0004298 | A1* | 1/2018 | Liu | H03K 17/9542 |
| 2018/0357055 | A1* | 12/2018 | Apte | G06F 8/51 |
| 2018/0367549 | A1* | 12/2018 | Jang | G06N 5/022 |
| 2019/0160578 | A1 | 5/2019 | Nakagawa et al. | |
| 2019/0163172 | A1* | 5/2019 | Daniel | B23K 9/1276 |
| 2019/0205402 | A1* | 7/2019 | Sernau | G06Q 50/01 |
| 2019/0265657 | A1 | 8/2019 | Inagaki et al. | |
| 2020/0038984 | A1* | 2/2020 | Daniel | B23K 9/1062 |
| 2020/0082113 | A1* | 3/2020 | Van Liesdonk | G06Q 10/087 |
| 2021/0142467 | A1* | 5/2021 | Burkhardt | G06N 20/00 |
| 2021/0150623 | A1* | 5/2021 | Rostami | G06V 40/20 |
| 2021/0181705 | A1* | 6/2021 | Okuaki | G05B 19/41875 |
| 2021/0308782 | A1* | 10/2021 | Sakurai | B23K 9/173 |
| 2021/0318673 | A1* | 10/2021 | Kitchen | B23K 31/006 |

FOREIGN PATENT DOCUMENTS

| | | |
|---|---|---|
| DE | 10 2016 119 280 A1 | 4/2018 |
| DE | 10 2021 002 047 A1 | 7/2021 |
| DE | 10 2021 002 565 A1 | 7/2021 |
| DE | 10 2021 002 682 A1 | 7/2021 |
| EP | 3 254 161 A1 | 12/2017 |
| EP | 3 329 433 A1 | 6/2018 |
| EP | 3 466 588 A1 | 4/2019 |
| EP | 3 178 597 B1 | 5/2019 |
| EP | 3 539 713 A1 | 9/2019 |
| EP | 3 542 943 A1 | 9/2019 |
| WO | WO-2019/103772 A1 | 5/2019 |
| WO | WO-2020/205998 | 10/2020 |

OTHER PUBLICATIONS

Al-Sahib NK, Ameer HK, Ibrahim SG. Monitoring and quality control of stud welding. Al-Khwarizmi Engineering Journal. Mar. 1, 2009; 5(1):53-70. (Year: 2009).*

Shahabi H, Kolahan F. Regression modeling of welded joint quality in gas metal arc welding process using acoustic and electrical signals. Proceedings of the Institution of Mechanical Engineers, Part B: Journal of Engineering Manufacture. Oct. 2015;229(10): 1711-21. (Year: 2015).*

Hildebrand J, Soltanzadeh H. A review on assessment of fatigue strength in welded studs. International Journal of Steel Structures. Jun. 2014;14:421-38. (Year: 2014).*

Nagesh DS, Datta GL. Prediction of weld bead geometry and penetration in shielded metal-arc welding using artificial neural networks. Journal of Materials Processing Technology. Apr. 30, 2002;123(2):303-12. (Year: 2002).*

Ishak MS, Ali WK. Apparatus for Welding Training Program. Journal of Industry, Engineering and Innovation. Feb. 11, 2019;1(1). (Year: 2019).*

Başyiğit AB, Kurt A. Investigation of the weld properties of dissimilar S32205 duplex stainless steel with AISI 304 steel joints produced by arc stud welding. Metals. Mar. 1, 2017;7(3):77. (Year: 2017).*

Fioravanti CC, Centeno TM, Da Silva Mr. A deep artificial immune system to detect weld defects in DWDI radiographic images of petroleum pipes. Ieee Access. Dec. 16, 2019;7:180947-64. (Year: 2019).*

International Search Report and Written Opinion on PCT Appl. Ser. No. PCT/US2022/024043 dated Jul. 15, 2022 (12 pages).

International Preliminary Report on Patentability for PCT App. PCT/US2022/024043 dated Oct. 12, 2023 (9 pages incl. IPRP transmittal).

* cited by examiner

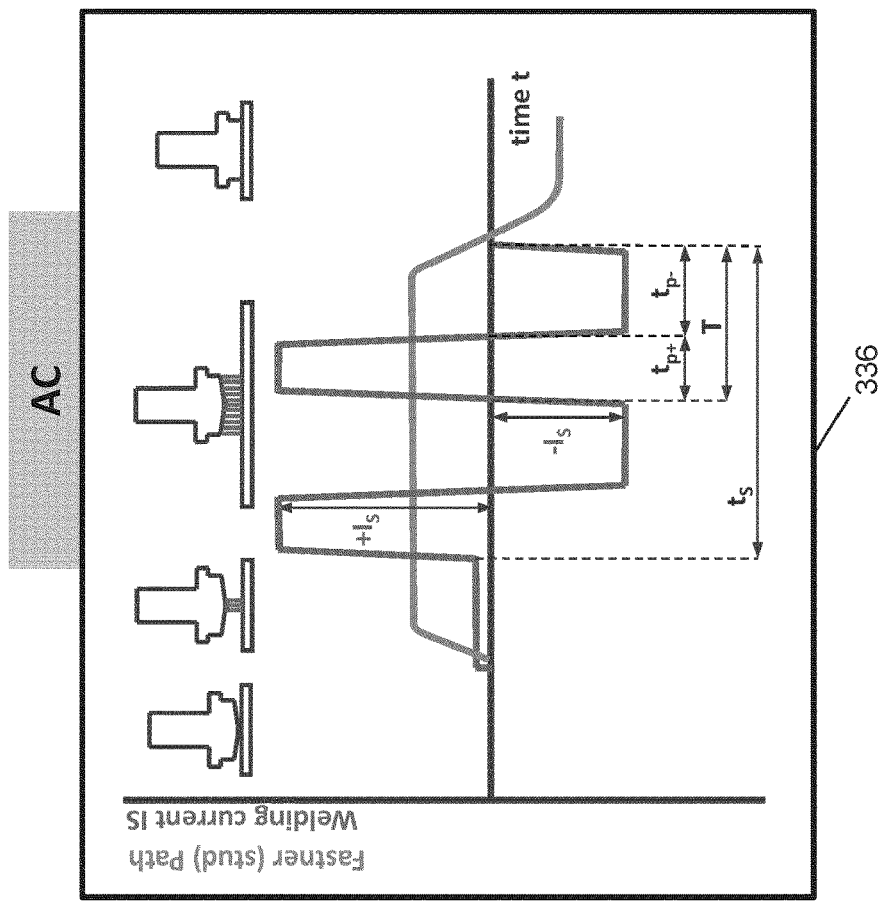
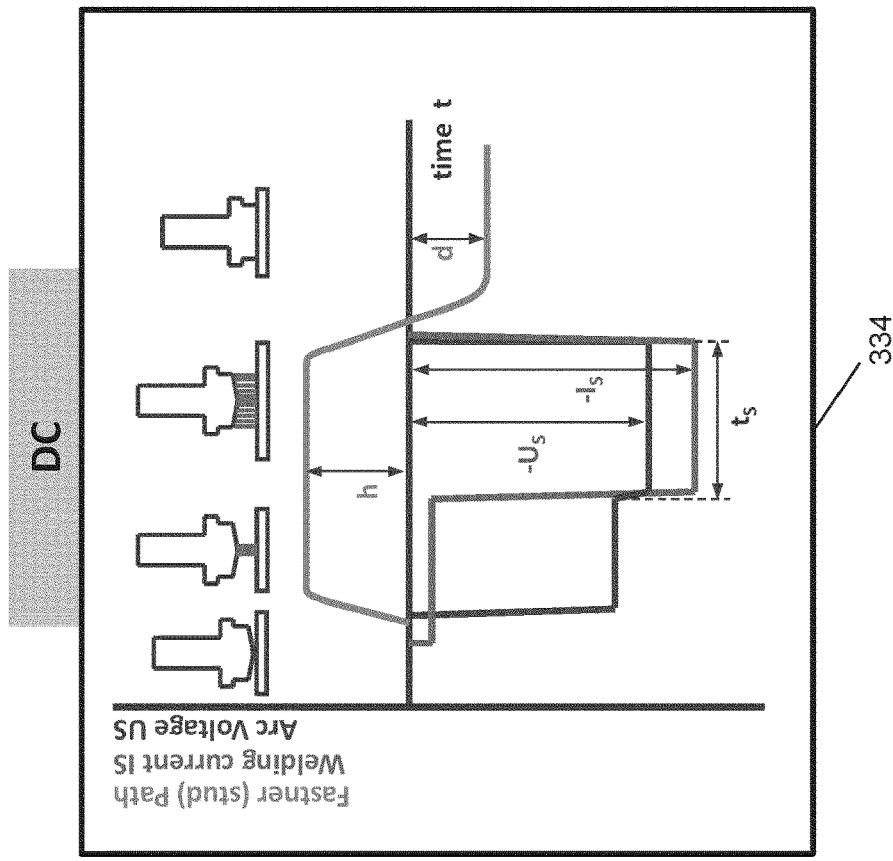
FIG. 3D

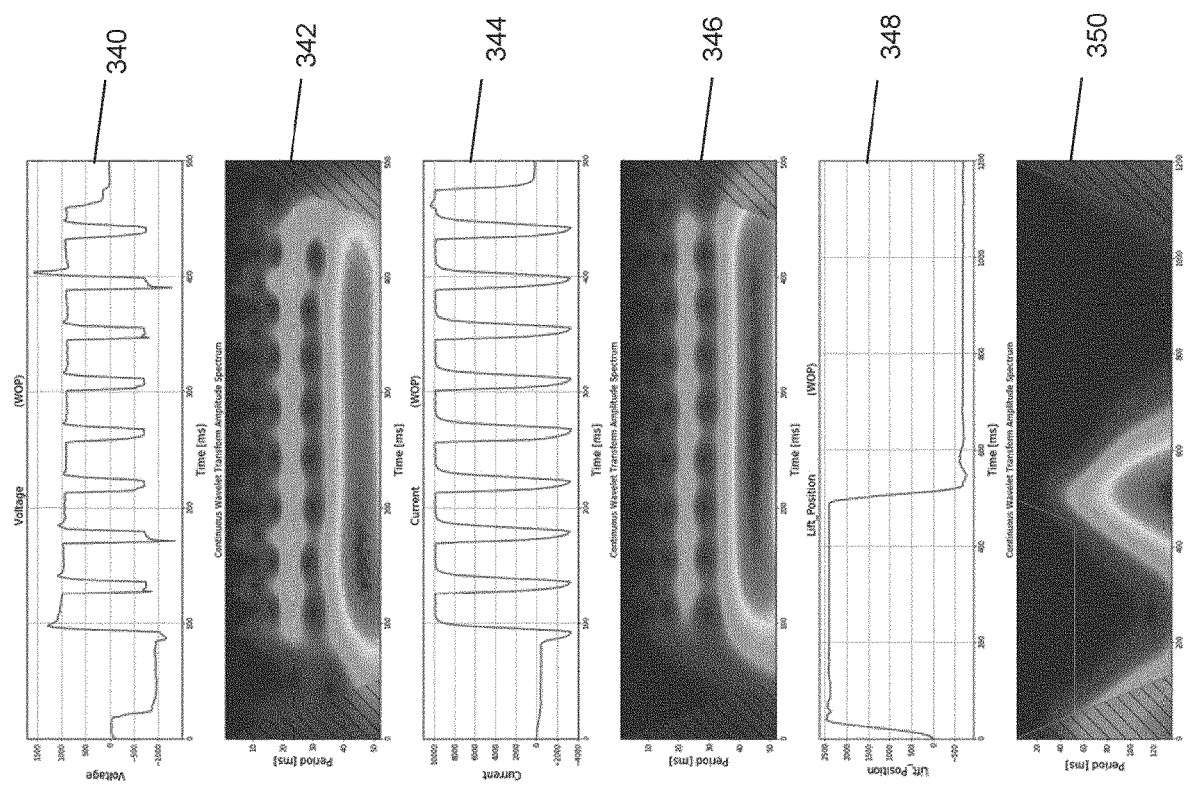

| | Folder_Name | WIP | DateTime | StudID | LMPenetrationActual | WeldTimeActual | sampletime | 0 | 1 | 2 | ... | 422 | 423 | 424 | 425 | 426 | 427 | 428 | 429 | 430 | 431 |
|---|---|---|---|---|---|---|---|---|---|---|---|---|---|---|---|---|---|---|---|---|---|
| 159 | Folder_1 | 0 | 2020-11-08 13:44:09+02:00 | 26 | -0,12 | 41,2 | 500 | 0 | 0 | 0 | ... | 434,0 | 434,0 | 434,0 | 434,0 | 434,0 | 434,0 | 434,0 | 434,0 | 434,0 | 434,0 |
| 160 | Folder_1 | 0 | 2020-11-08 13:44:07+02:00 | 26 | -0,12 | 41,2 | 500 | 0 | 0 | 0 | ... | 434,0 | 434,0 | 434,0 | 434,0 | 434,0 | 434,0 | 434,0 | 434,0 | 434,0 | 434,0 |
| 161 | Folder_1 | 0 | 2020-11-08 13:44:54+02:00 | 26 | -0,18 | 61,7 | 500 | 0 | 0 | 0 | ... | 425,0 | 425,0 | 425,0 | 425,0 | 425,0 | 425,0 | 425,0 | 425,0 | 425,0 | 425,0 |
| 162 | Folder_1 | 0 | 2020-11-08 13:44:56+02:00 | 26 | -0,18 | 61,7 | 500 | 0 | 0 | 0 | ... | 425,0 | 425,0 | 425,0 | 425,0 | 425,0 | 425,0 | 425,0 | 425,0 | 425,0 | 425,0 |
| 188 | Folder_2 | 0 | 2020-11-12 11:26:15+02:00 | 30 | -0,69 | 182,5 | 500 | 0 | 0 | 0 | ... | -1229,0 | -1983,0 | -2596,0 | -2927,0 | -3120,0 | -3229,0 | -2293,0 | 157,0 | 2886,0 | 5147,0 |
| ... | | | | | | | | | | | | | | | | | | | | | |
| 1533 | Folder_9 | 1 | 2020-11-14 15:47:12+02:00 | 254 | -0,69 | 187,8 | 500 | 0 | 0 | 0 | ... | -452,0 | -1563,0 | -2298,0 | -2746,0 | -3039,0 | -3232,0 | -3303,0 | -2456,0 | -266,0 | 2256,0 |
| 1534 | Folder_9 | 1 | 2020-11-14 15:47:22+02:00 | 254 | -0,69 | 187,4 | 500 | 0 | 0 | 0 | ... | -2538,0 | -2891,0 | -3098,0 | -3200,0 | -3273,0 | -3350,0 | -2247,0 | 112,0 | 2601,0 | 4889,0 |
| 1535 | Folder_9 | 1 | 2020-11-14 15:47:27+02:00 | 254 | -0,69 | 187,3 | 500 | 0 | 0 | 0 | ... | -1602,0 | -2315,0 | -2729,0 | -2976,0 | -3349,0 | -3669,0 | -2888,0 | -621,0 | 2097,0 | 4487,0 |
| 1536 | Folder_9 | 1 | 2020-11-14 15:47:36+02:00 | 254 | -0,69 | 189,0 | 500 | 0 | 0 | 0 | ... | -1809,0 | -2436,0 | -2995,0 | -3362,0 | -3399,0 | -3413,0 | -2152,0 | 537,0 | 3159,0 | 5354,0 |
| 1537 | Folder_9 | 1 | 2020-11-14 15:47:44+02:00 | 254 | -0,70 | 189,0 | 500 | 0 | 0 | 0 | ... | -2550,0 | -2903,0 | -3106,0 | -3227,0 | -3318,0 | -3387,0 | -2217,0 | 199,0 | 2628,0 | 4940,0 |

| ROOT CAUSE | | | | | | | |
|---|---|---|---|---|---|---|---|
| 2 | 3 | 4 | 5 | 6 | 7 | | |
| | 13 | 3 | 1 | | | | |
| | | | 3 | 23 | 3 | | |
| | 21 | | 4 | 2 | | | |
| 3 | 1 | 3 | | 34 | 3 | | |
| 9 | 62 | 2 | 18 | 30 | 94 | | |
| | | 3 | 1 | | 7 | | |
| | 1 | 4 | | | 1 | | |
| | 2 | 2 | | | | | |
| | | | | | | | |
| | | 1 | 1 | | | | |
| 15 | | | | | 2 | | |
| 30 | 50 | 55 | 17 | 32 | 10 | | |
| 8 | 7 | 6 | 2 | 17 | 1 | | |
| | | | 1 | 1 | | | |
| 2 | | 9 | 3 | 1 | 2 | | |
| 59 | 9 | 9 | 10 | 10 | 2 | | |

802

CLOSE →

20002 : NO SOW

INFORMATION TITLE PLACEHOLDER

THE REQUIRED SIGNAL SOW (STUD ON WORK) FOR STARTING A WELD CYCLE IS NOT RECOGNIZED.

| ACTIONS | CONFIDENCE LEVEL | RECOMMENDED | TAKEN |
|---|---|---|---|
| CHECK THE FEED PARAMETERS | 90 | ☐ | ☒ |
| REPLACE THE COLLET | 90 | ☒ | ☐ |
| REPLACE THE WELD TOOL | 90 | ☒ | ☐ |
| INSPECT THE GROUND CABLES, GROUND HOLD-DOWN DEVICE AND THE CABLE PACKAGE FOR DEFECTS AND CONTAMINATION | 90 | ☐ | ☐ |

ADD COMMENTS (OPTIONAL):

(SUBMIT)

HISTORY (CLOSE:ALL)

| RECOMMENDED ACTION | REMOVE THE STUD FROM THE WELD TOOL | 2021-04-07 09:44:29 |
| RECOMMENDED ACTION | CHECK THE DISTANCE BETWEEN THE WELD TOOL AND THE | 2021-04-07 09:44:29 |

COMPUTER MODELING FOR DETECTION OF DISCONTINUITIES AND REMEDIAL ACTIONS IN FASTENING SYSTEMS

CROSS-REFERENCE TO RELATED APPLICATIONS

This application is a continuation of U.S. patent application Ser. No. 17/717,795, filed Apr. 11, 2022, which claims priority to U.S. Provisional Patent App. Ser. No. 63/173,841, filed Apr. 12, 2021, each of which is incorporated by reference in its entirety for all purposes.

TECHNICAL FIELD

This application relates generally to generating, training, and operating computer models to detect, analyze, and visualize discontinuities and/or anomalies in joinings (e.g., stud welding, riveting, self-pierce riveting, coupling, adhesive, weldment structures) and identifying corrective, preventative, and remedial actions.

BACKGROUND

Identifying discontinuities and abnormalities (e.g., quality related anomalies) in a joining (e.g., stud welding and riveting) is of immense importance, particularly in the automotive industry where numerous stud weldings are performed during the manufacturing process. A typical vehicle may include a few hundred stud weldings performed by automatic joining machines (or sometimes manually) at a rapid pace. Discontinuity and abnormality in any of the performed joinings can lead to delays in the manufacturing processes and/or vehicle recalls at a high economic and environmental cost. Early detection of presence, type, size, and location of discontinuities and anomalies in joinings can help welding and inspection technicians make the necessary repairs in a cost-effective manner.

Various types of joining discontinuities and anomalies may include, but are not limited to, cracks, pores and bubbles, incomplete or insufficient penetration, misalignment of metallic bodies, insufficient fusion of the metallic bodies. Certain anomalies may be caused by dirty surfaces (e.g., oily surface or metal having fingerprint. Conventional methods and systems have proven to be ineffective and/or undesirable. Currently, a technician visually inspects the joining to identify discontinuities and anomalies in the joining. However, visual inspection of joining is not consistently reliable due to human error. Moreover, this method relies on subjective skills of each technician, which produces inconsistent results. Further, this method is highly unreliable in light of the rapid pace of joinings performed during assembly of a vehicle.

SUMMARY

For the aforementioned reasons, there is a desire for a non-invasive and non-destructive solution to identify anomalies and discontinuities in joinings in a timely manner (e.g., in real-time or near real-time as the automatic joining machines are performing the joinings). There is a desire for a computer model to generate data indicating anomalies, abnormalities, and discontinuities, such that the results simulate conventional anomaly-detection methods. For instance, there is a desire to use AI modeling techniques to detect an anomaly in a timely manner using data received from the joining machine (whether operated automatically or manually), such that immediate action can be taken (e.g., stopping the process).

Though aspects of the methods and systems contained herein are described in the context of joinings, it is expressly understood that such methods and systems (including the AI models) can be applied to any joining system, such as rivet welding.

The method and systems described herein relate generally to improvements in automated (and sometimes manual) joining tools. In the present context, the terms "fastening" or "joining" are intended to refer to all methods for attaching elements to components, and, in particular, attaching metal or plastic elements to metal or plastic components; for example by adhesive bonding, screwing, riveting (such as self-piercing riveting, blind riveting of rivets or nuts, or clinch riveting), or by the union of materials via welding (including short-cycle arc welding or drawn-arc welding). Short-cycle arc welding is frequently referred to as stud welding, even though studs are not the only parts welded in this manner. Self-piercing rivets and associated tools for joining two or more pieces of material together are generally well-known in the automotive industry. Self-piercing rivets have typically been used in non-critical connections attaching two or more pieces of material together—to assemble an automotive body at a framing station, for instance. Stud welding is used primarily, but not exclusively, in automotive production. In this context, metal elements, such as metal studs with and without threads, eyes, nuts, etc., are welded onto the sheet metal or work piece of a vehicle body. The metal elements then serve as anchors or mounting elements, for example for attaching passenger compartment fittings, lines, wiring and the like, to the body metal. The metal elements may be welding studs that have a shank and a head somewhat larger in diameter than the stud shank. The head is welded to the work piece. Such joining or fastening tools are commonly attached to a movable frame (e.g., a robot and comprise a holding element for holding a fastener destined to be joined to a work piece, a joining drive element to move the holding element along a joining direction for joining the fastener to the work piece, and a feeder for feeding fasteners to the holding element.

In an embodiment, a method comprises: receiving, by a processor, a plurality of attributes corresponding to a joining; executing, by the processor, an artificial intelligence model to identify one or more attributes associated with at least one discontinuity or anomaly of the joining, wherein the artificial intelligence model was trained based on a plurality of attributes corresponding to previous joining having at least one discontinuity or anomaly; wherein the plurality of attributes corresponding to previous joining comprises at least a voltage value, a current value, or a lift value for each previous joining; and presenting, by the processor, one or more attributes associated with at least one discontinuity or anomaly of the joining.

The plurality of attributes corresponding to previous fastenings may further comprise at least one of metal sheet compositional attributes, metal sheet geometric attributes, stud compositional attributes, or stud geometric attributes.

The artificial intelligence model may calculate a likelihood of a discontinuity or an anomaly being present within the joining. The artificial intelligence model may calculate a depth and a type associated with each discontinuity or anomaly.

The method may further comprise transmitting, by the processor, an instruction to a joining machine to modify its welding.

The joining may be a stud welding. The joining may be performed via a rivet welding method.

The method may further comprise executing, by the processor, a second artificial intelligence model that receives an input of the one or more attributes associated with at least one discontinuity or anomaly generated by the artificial intelligence model and generates an action associated with the at least one discontinuity or anomaly, wherein the second artificial intelligence model was trained based on one or more attributes associated with at least one discontinuity or anomaly corresponding to previous joinings and one or more corresponding actions; and presenting, by the processor, for display at least one of: the one or more attributes associated with at least one discontinuity or anomaly generated by the artificial intelligence model; or the action generated by the second artificial intelligence model.

The action generated by the second artificial intelligence model may be a corrective or preventative action.

In another embodiment, a system comprises a server comprising a processor and a non-transitory computer-readable medium containing instructions that when executed by the processor causes the processor to perform operations comprising: receiving a plurality of attributes corresponding to a joining; executing an artificial intelligence model to identify one or more attributes associated with at least one discontinuity or anomaly of the joining, wherein the artificial intelligence model was trained based on a plurality of attributes corresponding to previous joinings having at least one discontinuity or anomaly; and wherein the plurality of attributes corresponding to previous joinings comprises at least a voltage value, a current value, or a lift value for each previous joining; and presenting one or more attributes associated with at least one discontinuity or anomaly of the joining.

The plurality of attributes corresponding to previous joinings may further comprise at least one of metal sheet compositional attributes, metal sheet geometric attributes, stud compositional attributes, or stud geometric attributes.

The artificial intelligence model may calculate a likelihood of a discontinuity or an anomaly being present within the joining. The artificial intelligence model may calculate a depth and a type associated with each discontinuity or anomaly.

The instruction may further cause the processor to transmit an instruction to a joining machine to modify its welding.

The joining may be a stud welding. The joining may be performed via a rivet welding method.

The instruction may further cause the processor to execute a second artificial intelligence model that receives an input of the one or more attributes associated with at least one discontinuity or anomaly generated by the artificial intelligence model and generates an action associated with the at least one discontinuity or anomaly, wherein the second artificial intelligence model was trained based on one or more attributes associated with at least one discontinuity or anomaly corresponding to previous joinings and one or more corresponding actions; and presenting, by the processor, for display at least one of: the one or more attributes associated with at least one discontinuity or anomaly generated by the artificial intelligence model; or the action generated by the second artificial intelligence model; and presenting one or more attributes associated with at least one discontinuity or anomaly of the joining.

The action generated by the second artificial intelligence model may be a corrective or preventative action.

In another embodiment a system comprises a joining machine; and a processor in communication with the joining machine, the processor configured to receive a plurality of attributes corresponding to a joining; execute an artificial intelligence model to identify one or more attributes associated with at least one discontinuity or anomaly of the joining, wherein the artificial intelligence model was trained based on a plurality of attributes corresponding to previous joinings having at least one discontinuity or anomaly; and wherein the plurality of attributes corresponding to previous joinings comprises at least a voltage value, a current value, or a lift value for each previous joining.

The processor may be further configured to execute a second artificial intelligence model that receives an input of the one or more attributes associated with at least one discontinuity or anomaly generated by the artificial intelligence model and generates an action associated with the at least one discontinuity or anomaly, wherein the second artificial intelligence model was trained based on one or more attributes associated with at least one discontinuity or anomaly corresponding to previous joinings and one or more corresponding actions; and presenting, by the processor, for display at least one of: the one or more attributes associated with at least one discontinuity or anomaly generated by the artificial intelligence model; or the action generated by the second artificial intelligence model.

There is a desire for a computer system to produce results that are no longer dependent on technicians' subjective skills and interpretation. The methods and systems described herein provide a formalized approach to identifying anomalies in a single automated framework with little to no human intervention.

BRIEF DESCRIPTION OF THE DRAWINGS

Non-limiting embodiments of the present disclosure are described by way of example with reference to the accompanying figures, which are schematic and are not drawn to scale. Unless indicated as representing the background art, the figures represent aspects of the disclosure.

FIGS. 3B-K illustrate different data visualizations associated with training the first AI model, according to various embodiments.

FIG. 5 illustrates joining data received from one or more sensors, according to an embodiment.

FIG. 6-8 illustrate visualization of joining discontinuities and/or anomalies, according to an embodiment.

DETAILED DESCRIPTION

Figure 1A:
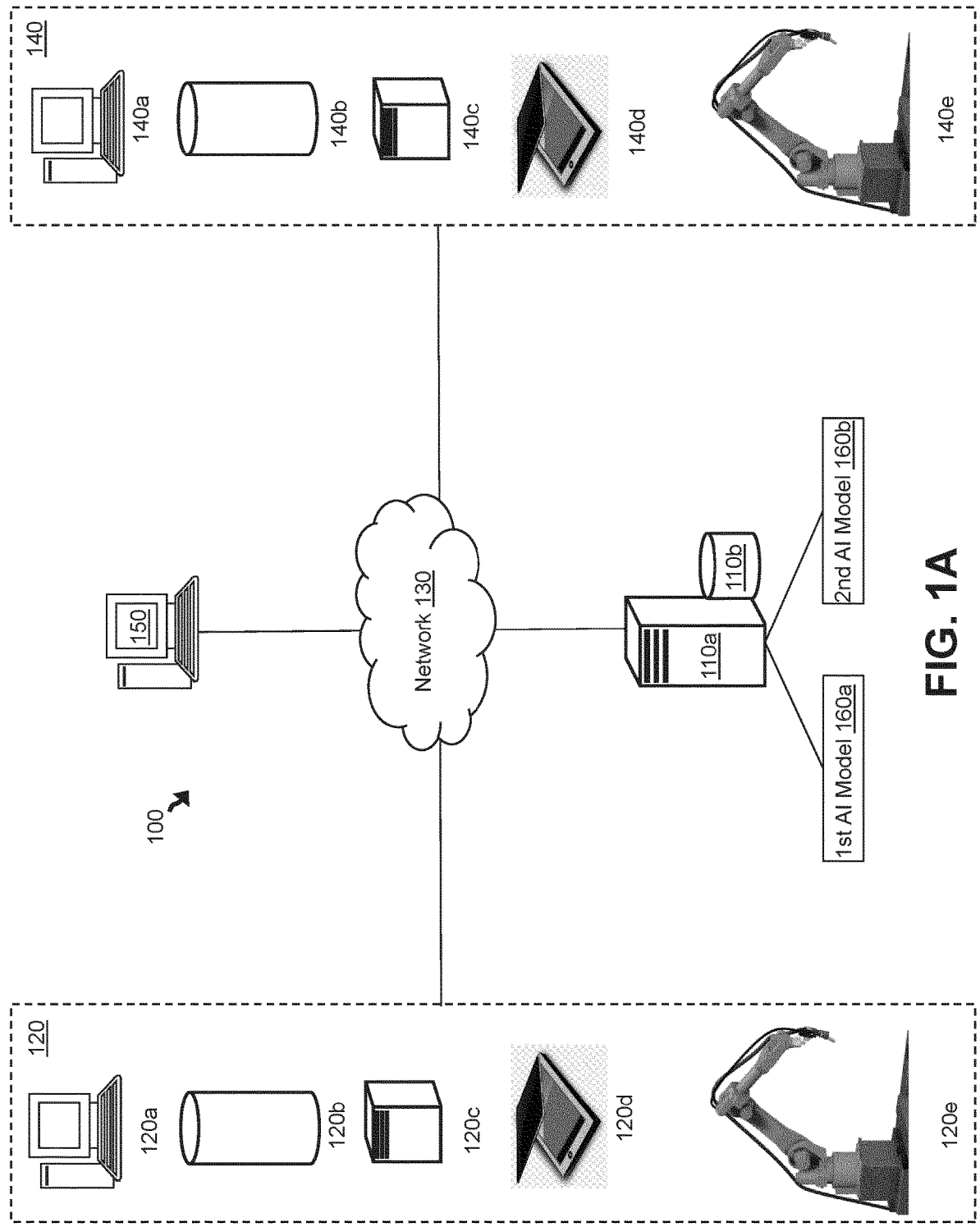
FIG. 1A illustrates components of an anomaly-detection system, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein—and additional applications of the principles of the subject matter illustrated herein—that would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

As will be described below, a server (referred to herein as the analytics server) can retrieve and analyze data using various methods described herein to identify joining anomalies. FIG. 1A is a non-limiting example of components of an anomaly-detection system 100 in which an analytics server 110a operates. The analytics server 110a may utilize features described in FIG. 1A to retrieve data and generate/display results. The analytics server 110a is communicatively coupled to a system database 110b, electronic data sources 120a-d (collectively electronic data sources 120), end-user devices 140a-e (collectively end-user device 140), and an administrator computing device 150. The system 100 is not confined to the components described herein and may include additional or other components not shown for brevity, which are to be considered within the scope of the embodiments described herein.

The above-mentioned components may be connected to each other through a network 130. The examples of the network 130 may include, but are not limited to, private or public LAN, WLAN, MAN, WAN, and the Internet. The network 130 may include both wired and wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), EDGE (Enhanced Data for Global Evolution) network.

The analytics server 110a may utilize one or more application programming interfaces (APIs) to communicate with one or more of the electronic devices described herein. For instance, the analytics server may utilize APIs to automatically receive data from the electronic data source 120. The analytics server 110a can receive data as it is generated, monitored, and/or processed by the electronic data source 120. For instance, the analytics server 110a may utilize an API to receive joining data from the joining machine 120e (e.g., welding machine) without any human intervention. This automatic communication allows for faster retrieval and processing of data.

The analytics server 110a may generate and/or host a graphical user interface (GUI) configured to use various computer models (including AI models) to identify and display joining discontinuities and anomalies. The GUI can be displayed on the electronic data source 120, the administrator computing device 150, and/or end-user devices 140.

An example of the GUI generated and/or hosted by the analytics server 110a may be a web-based application or a website configured to be displayed on different electronic devices, such as mobile devices, tablets, personal computers, and the like. Even though certain embodiments describe the analytics server 110a displaying the results, it is expressly understood that the analytics server 110a may either directly generate and display the GUIs described herein or may present the data to be presented on a GUI displayed on the end-user devices 140.

In a non-limiting example, a technician operating the technician device 120d may instruct the analytics server 110a to display discontinuities/anomaly data. The analytics server 110a may then display the results in accordance with the request of an end-user (e.g., technician). For instance, the analytics server 110a may display likelihood of different defects and corresponding corrective/preventative actions to be performed. The analytics server 110a may also display a confidence value indicating the analytic server's confidence regarding the defects and/or the recommended actions. For instance, the analytics server 110a may indicate that it has identified an anomaly (e.g., discontinuity) at a certain depth and it is 90% confident that the anomaly exists (e.g., FIG. 6-8).

The analytics server 110a may host a web site accessible to end-users operating any of the electronic devices descried herein (e.g., end-users), where the content presented via the various webpages may be controlled based upon each particular user's role or viewing permissions. The analytics server 110a may be any computing device comprising a processor and non-transitory, machine-readable storage capable of executing the various tasks and processes described herein. Non-limiting examples of such computing devices may include servers, computers, workstation computers, personal computers, and the like. While this example of the system 100 includes a single analytics server 110a, in some configurations, the analytics server 110a may include any number of computing devices operating in a distributed computing environment.

The analytics server 110a may execute one or more software applications configured to display the GUI (e.g., host a website), which may generate and serve various webpages to each electronic data source 120 and/or end-user devices 140. Different end-users may use the website to view and/or interact with the predicted results. In some configurations, the analytics server 110a may display the results on any of the computing devices depicted in FIG. 1A.

The analytics server 110a may be configured to require user authentication based upon a set of user authorization credentials (e.g., username, password, biometrics, cryptographic certificate, and the like). In such implementations, the analytics server 110a may access the system database 110b configured to store user credentials, which the analytics server 110a may be configured to reference in order to determine whether a set of entered credentials (purportedly authenticating the user) match an appropriate set of credentials, thereby identifying and authenticating the user.

The analytics server 110a may also store data associated with each user operating one or more electronic data sources 120 and/or end-user devices 140. The analytics server 110a may use the data to weigh interaction while training various AI models accordingly. For instance, the analytics server 110a may monitor a technician's interactions with the results and train the machine-learning or other computer models described herein based on the technician's interactions. The analytics server 110a may also monitor how a detected (predicted) anomaly was rectified (e.g., which preventative and/or corrective action was taken) to train an AI model (e.g., second AI model) to create appropriate recommendations.

In some configurations, the analytics server 110a may generate and host the GUI based on a particular user's role within the system 100. In such implementations, the user's role may be defined by data fields and input fields in user records stored in the system database 110b. The analytics server 110a may authenticate the end-user and identify the end-user's role by executing an access directory protocol (e.g., LDAP). The analytics server 110a may generate webpage content that is customized according to the user's role defined by the user record in the system database 110b.

The analytics server 110a receives joining data and other pertinent data from one or more of the electronic data sources 120, analyzes the data, and displays the results. For instance, in a non-limiting example, the analytics server 110a may query and retrieve joining data from the joining machine 120e and combine the joining data with other data received/retrieved from a technician operating the technician device 120d (e.g., data regarding the stud and/or the material being fastened or welded). The analytics server 110a then uses various models (e.g., stored within the system database 110b) to analyze the retrieved data. The analytics server 110a then displays the results via the GUIs described herein on the administrator computing device, the end-user devices 140, and/or the technician device 120d.

The joining machine 120e may be configured for automatic joining (e.g., welding) of an area—performing a stud welding within a vehicle's frame, for instance. The joining machine 120e may include various sensors that can monitor attributes associated with the joining and communicate said attributes (e.g., compiled in a weld log) to the analytics server 110a. For instance, the joining machine 120e may include a processor and a communication module allowing the joining machine 120e to transmit (e.g., using wireless or wired technology) joining data to the analytics server 110a. As will be described below, the analytics server 110a may use the data provided by the joining machine 120e to identify and/or visualize various discontinuities and anomalies.

In stud welding, metal elements, such as metal studs with or without threads, eyes, nuts, and the like, are welded onto the sheet metal of a vehicle body (also referred to herein as the metal sheet or underlying metal sheet). The welding tools are commonly attached to a movable frame (e.g., a robot), and comprise a holding element for holding a fastener, a joining drive element to move the holding element along a joining direction for joining the fastener to the metal sheet, and a feeder for feeding fasteners to the holding element.

Once a fastener is arranged in the holding element, a conventional joining or joining method can be carried out. In stud welding (e.g., in the drawn-arc method) the welder (whether automatic or manual) first places the fastener on the metal sheet. Then a pre-conduction electric current is applied, which flows through the fastener and the metal sheet. As a result, an electric arc forms. The welder then switches to the welding current. The end faces of the fastener and underlying metal sheet (opposite one another) are melted by the high welding current. Then the fastener is lowered onto the metal sheet so that the two molten faces combine. The welding current is then switched off (e.g., upon contact with the component and short-circuiting of the arc, or shortly beforehand), the molten material solidifies, and the weld connection is established. This process is typically performed at a very rapid pace (e.g., 50-200 milliseconds).

Figure 1B:
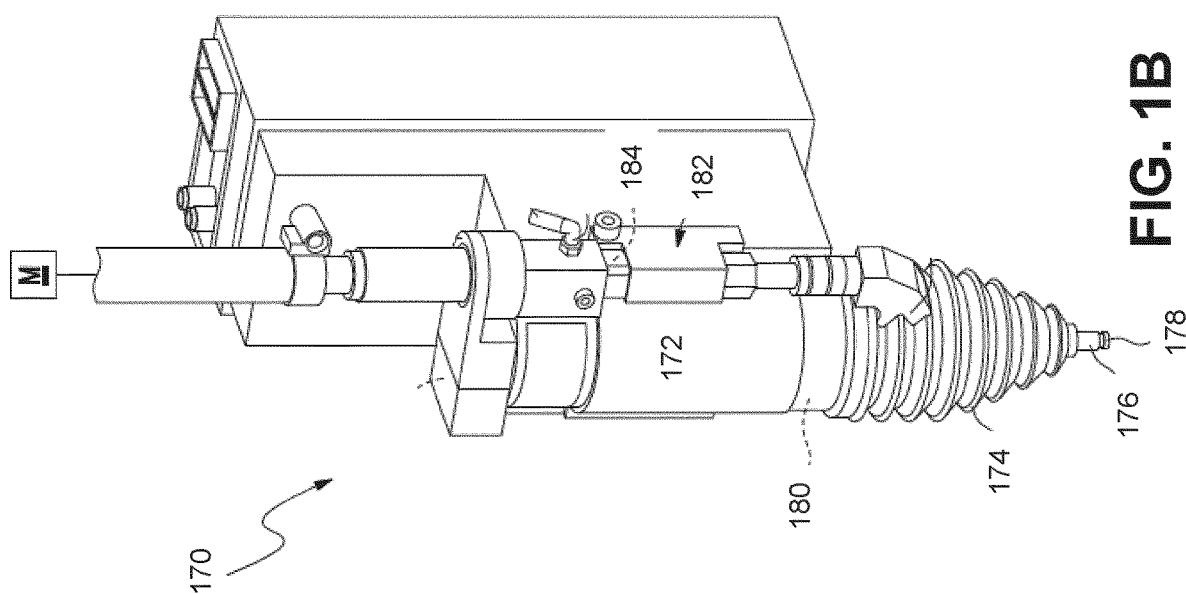
FIG. 1B illustrates a joining machine, according to an embodiment.

Referring now to FIG. 1B, an example of a stud-welding apparatus is depicted. The joining machine 120e may use the stud-welding apparatus 170 to perform stud welding. As describe herein, the stud-welding apparatus 170 may be incorporated into the joining machine 120e or may be manually operated by a human.

The depicted stud-welding apparatus 170 may be operated by a robot (joining machine 120e) with a stationary base from which two arms extend, articulately connected to each other. A flange may be provided at an end of the arm, and the stud-welding apparatus 170 can be attached to said flange. The stud-welding apparatus 170 may comprise a head 172. The head 172 may itself comprise a nose 174 with a receiving element 176. The receiving element 176 may receive the stud 178 to be joined to the underlying metal sheet. In other embodiments, the stud 178 can also refer to a rivet, a self-piercing rivet, a self-coring rivet, a self-flowing rivet, a blind rivet, a nut, a blind nut, a screw, and the like. Therefore, even though aspects of the methods, systems, and apparatuses discuss stud welding, these concepts are applicable to any joining methods, such as rivet welding.

The receiving element 176 may be a holding element for holding the stud before and/or the welding. The stud-welding apparatus 170 may further comprises a joining drive element 180. The joining drive element 180 may move the receiving element 176 along a joining direction for joining the stud to the metal sheet. A feeder 182 may comprise a feeding tube 184 configured to receive studs from a magazine drive the studs using compressed air.

The stud-welding apparatus 170 may also include a pressure sensor 186. The pressure sensor 186 is configured to gauge and transmit a correct measurement of the pressure used to move the stud during welding. The stud-welding apparatus 170 may also include various other sensors configured to gauge and transmit voltage and current associated with the welding performed. Even though the FIG. 1B displays a stud welding apparatus 170, the methods and systems described herein also apply to other joining systems.

Referring back to FIG. 1A, the analytics server 110a may receive data from the electronic data source 120, analyze the data using various methods described herein, and display the results (or present the results to be displayed) on one or more GUIs displayed on the end-user devices 140. Even though certain electronic data sources 120a-e and end-user devices 140a-e are shown as separate devices, it is understood that a single device can both provide data to the analytics server and display the results. In an example, the analytics server 110a may receive data from the joining machine 120e and may display the results onto (or otherwise transmit the results to) the same joining machine 120e (depicted as the joining machine 140e). In another example, the technician device 140d and 120d may refer to the same device. Therefore, a single device can act as both a data source and an end-user device.

The methods described herein can also be implemented on any of the devices depicted in FIG. 1A. For instance, the analytics server 110a may be associated (e.g., physically connected) with the joining machine 120e or 140e. The analytics server 110a can directly receive joining data associated with a joining and display various notifications described herein. Therefore, the depicted arrangement of computing features is a non-limiting example of a system architecture that can utilize the methods described herein to identify and/or visualize various anomalies or discontinuities.

The end-user devices 140 may be any computing device comprising a processor and a non-transitory machine-readable storage medium capable of performing the various tasks and processes described herein. Non-limiting examples of an end-user device may include workstation computers, laptop computers, tablet computers, and server computers. In operation, various end-users may use end-user devices 140 to access the GUI operationally managed by the analytics server 110a. Specifically, the end-user devices 140 may include job site computer 140a, job site database 140b, job site server 140c, technician device 140d, and/or the joining machine 140e.

The electronic data sources 120 may represent various electronic data sources that contain, retrieve, and/or input data associated with joining. For instance, the analytics server 110a may use the job site computer 120a, database 120b, server 120c, and technician device 120d (associated with the job site) to retrieve/pertinent data. In some configurations, the analytics server 110a may retrieve data and display the results on the same device.

The administrator computing device 150 may represent a computing device operated by a system administrator. The administrator computing device 150 may be configured to display retrieved data in the form of results generated by the analytics server 110a, where the system administrator can monitor various models utilized by the analytics server 110a, review feedback, and modify various thresholds/rules described herein.

Though certain embodiments describe how the analytics server 110a can identify stud welding, it is expressly understood that the methods and systems described herein apply to all joinings in all contexts (stud welding performed for vehicles or any other surfaces). Additionally, though the joinings are described as being performed by automatic joining machines 120e, it is also expressly understood that the methods and systems described herein apply to manual joining as well (e.g., manual welding). For instance, instead of the joining machine 120e (which is an automated joining machine), a human welder may perform the joining. The analytics server 110a may then receive joining data (e.g., a weld log) using various sensors associated with the joining, and may then train the AI models described herein and/or detect anomalies accordingly.

In operation, the joining machine 120e may automatically perform the stud welding. Additionally or alternatively, the joining may performed by a human welder. Using the methods and systems described herein, the analytics server 110a may communicate with one or more sensors of the joining machine 120e and retrieve various welding attributes associated with the joining to be analyzed. Additionally or alternatively, when the joining is performed by a human welder, the analytics server 110a may retrieve the joining attribute from another sensor (e.g., standalone sensor).

The analytics server 110a may access a plurality of AI models. Although the example system has the AI models stored on the analytics server 110a, the AI models may be stored on another device or server (e.g., store locally or in a cloud storage). The analytics server 110a may execute a first AI model 160a to generate a set of scores indicating a likelihood of a discontinuity or anomaly for different areas of the joining. Specifically, the analytics server 110a may receive joining attributes from the joining machine 120e. The joining machine 120e may include various sensors that monitor the joining. The sensors may transmit various attributes (e.g., a weld log) to the analytics server 110a, such as lift, voltage, current, stud attributes (e.g., material and/or diameter), and the like.

The first AI model 160a may have been previously trained by the analytics server 110a using previously performed joinings, their corresponding attributes (recorded in weld logs), and corresponding discontinuities and anomalies. The analytics server 110a may retrieve data associated with previous joinings from the electronic data sources 120 and/or end-user devices 140. For instance, the first AI model 160a may ingest the data received from the joining machine 120e and may calculate scores corresponding to different anomalies associated with the joining (each indicating a likelihood of a specific type of anomaly).

Figure 6:
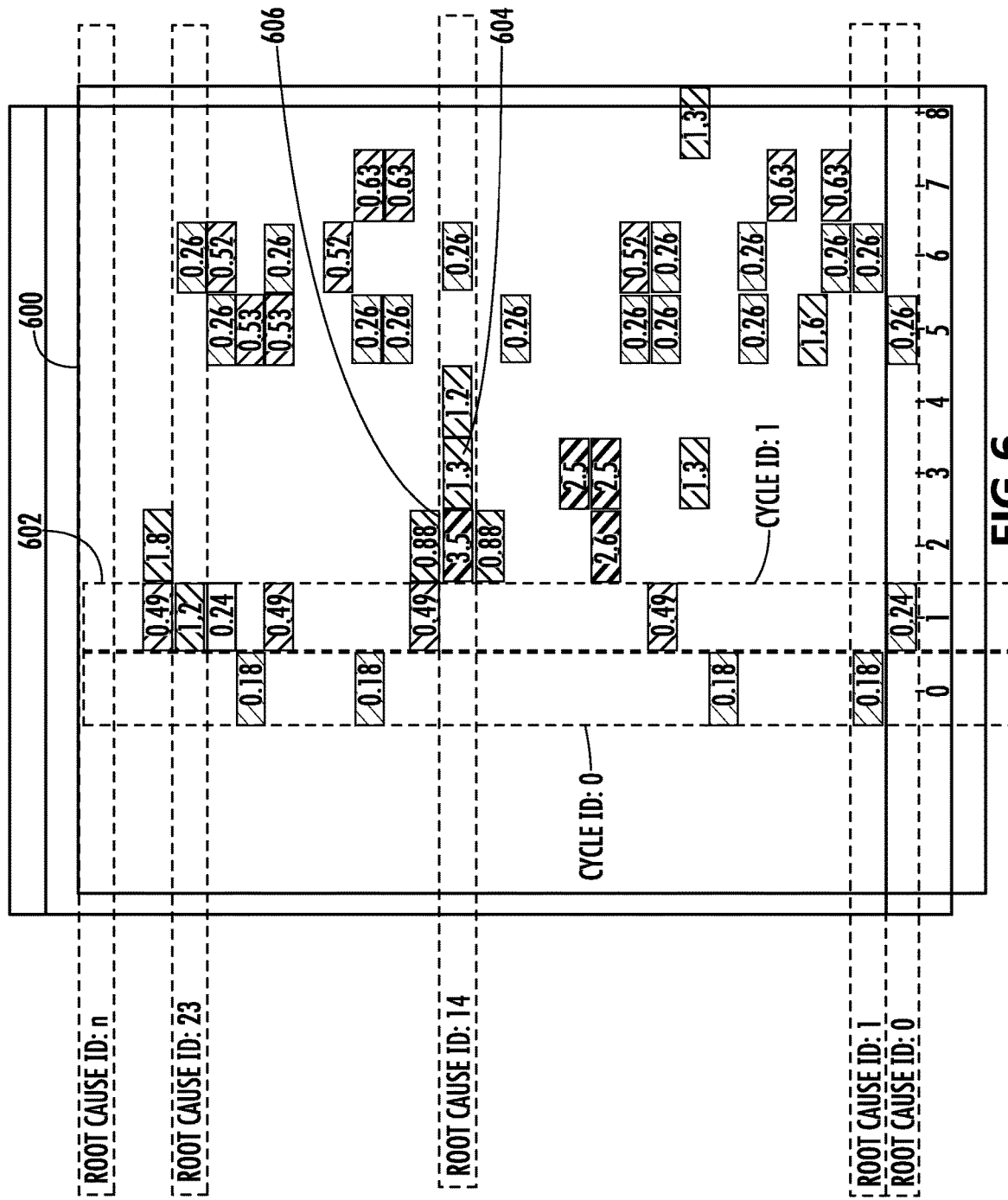
Figure 7:
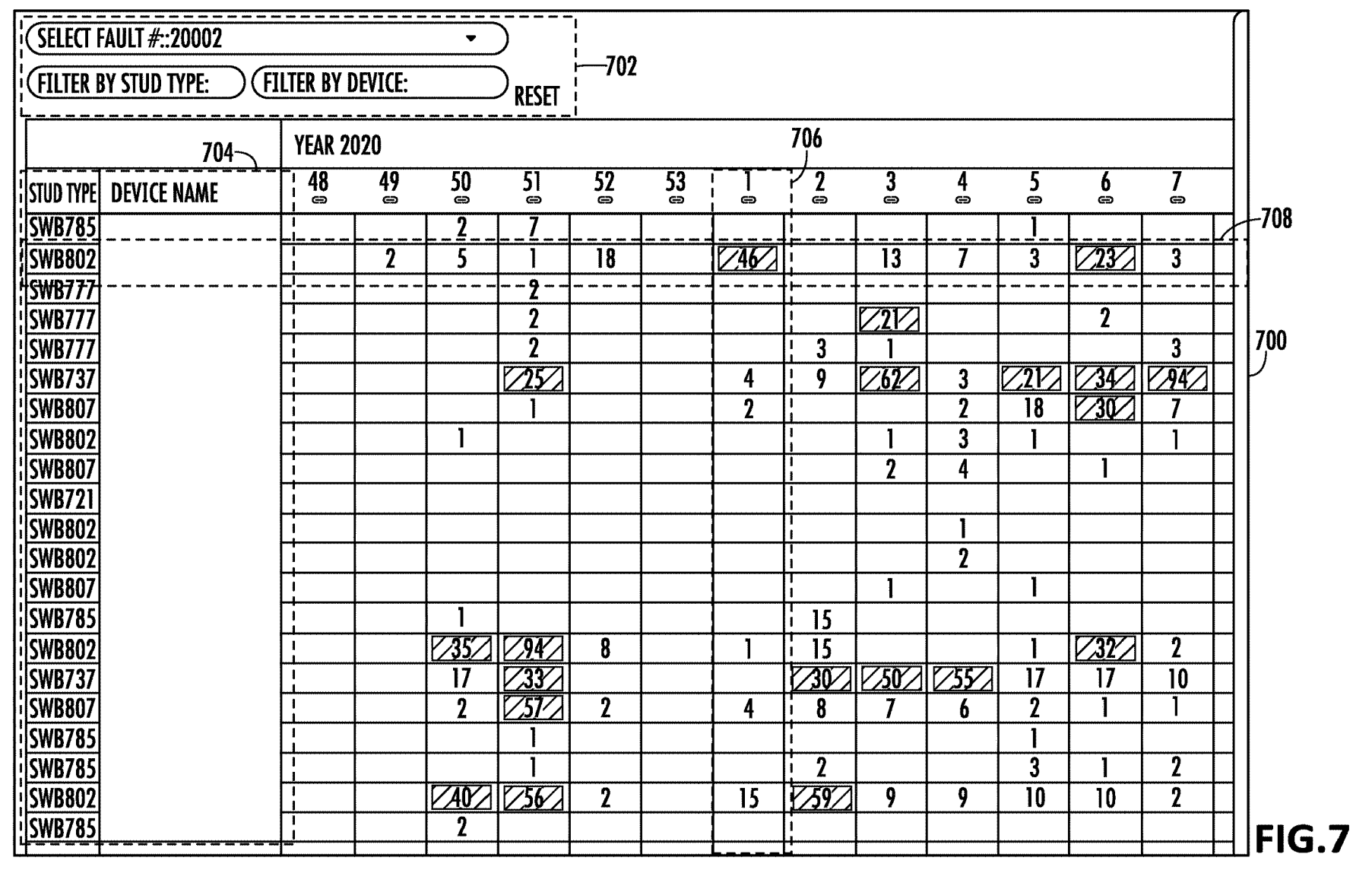

Upon identifying the likelihood of different anomalies and discontinuities being present within different joinings, the analytics server 110a may display results on the GUIs accessible by the end-user devices 140 (e.g., FIGS. 6-8). The analytics server 110a may generate various visual representations of the results, as depicted herein. In some embodiments, the analytics server 110a may execute a second AI model 160b to generate a recommendation regarding the anomaly detected by the first AI model 160a.

The second AI model 160b may receive the scores generated by the first AI model 160a. The second AI model 160b may have been previously trained using discontinuities, anomalies, discontinuity/anomaly attributes, and the method by which the discontinuity/anomalies were rectified. The second AI model 160b may then ingest the scores generated by the first AI model 160a and generate a recommendation, such as replacing a specific part of the joining machine 120e, stopping the joining machine 120e, or sending the joining anomaly for a second level review. This recommendation can be displayed on the platform provided by the analytics server 110a (FIG. 8).

Additionally or alternatively, the analytics server 110a may directly communicate with one or more devices, such as the joining machine 120e. The analytics server 110a may control and/or modify the behavior of the joining machine 120e in accordance with the results outputted by the first AI model 160a. For instance, the analytics server 110a may instruct the joining machine 120e (or any other components) to cease joining operations when joining errors/discontinuities have been identified. In another example, the analytics server 110a may instruct the joining machine 120e to perform various tasks that mitigate the identified joining discontinuities and/or other anomalies. In some configurations, the methods and systems described herein can be executed, such that real-time monitoring of joinings is available.

The instructions may also allow the joining machine 120e to re-calibrate itself accordingly. For instance, the instructions may indicate where the discontinuities are located. Using various correction and calibration protocols, the joining machine 120e may correct its joining parameters, such that similar defects no longer occur. For instance, when an anomaly is detected, the joining machine 120e may analyze various parameters of the performed joining and may revise those parameters for future joinings, such that anomalies are no longer occurring. This concept is also referred to as adaptive joining (e.g., adaptive welding).

The analytics server 110a can rely on data received using non-destructive methods to reverse engineer joining discontinuities and anomalies. The analytics server 110a may use joining data to predict discontinuities (AI model 160a) and/or make recommendations (AI model 160b). The analytics server may execute each of the models independently.

For instance, the analytics server 110*a* may execute the AI model 160*a* to detect and predict discontinuity/anomaly in a joining. The analytics server 110*a* may then execute the AI model 160*b* to generate a recommendation for a predicted discontinuity or anomaly that may have been predicted using the AI model 160*a*. Alternatively, anomalies or discontinuities may be predicted or detected using other methods. Therefore, the AI model 160*b* can be separately executed to generate recommendations.

In some configurations, the methods and systems described herein can be utilized in conjunction with other joining and error-detection methods to provide an automated error-proof joining process.

Using the methods and systems described herein, the analytics server can provide improvements in automated fastening or joining tools, such as stud welding tools, and specifically to improvements relating to the detection anomalies. As used herein, "joinings" or "welding" is intended to refer to all methods for attaching elements to components, and, in particular, attaching metal elements to metal components, for example by clinch riveting, or by the union of materials, such as welding, including short-cycle arc welding or drawn-arc welding. Short-cycle arc welding is frequently referred to as stud welding, even though studs are not the only parts welded in this manner.

In operation, the analytics server 110*a* may train the first AI model 160*a* and/or the second AI model 160*b* using data collected from the electronic data sources 120. The analytics server 110*a* may then execute the trained model(s) to identify anomalies associated with joinings performed (e.g., by the joining machine 140*e*).

Figure 2:
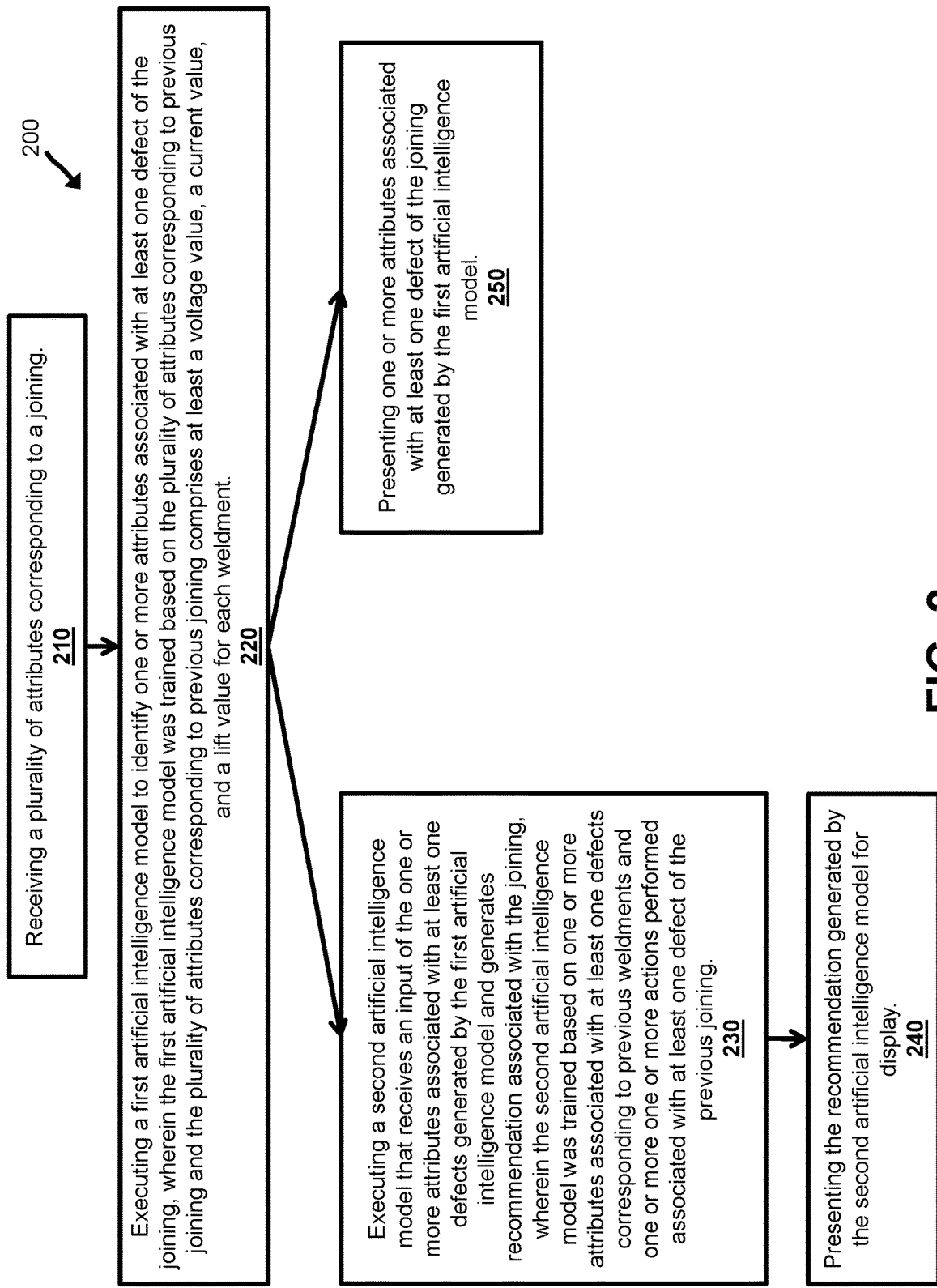
FIG. 2 illustrates a flow diagram of a process executed in an anomaly-detection system, according to an embodiment.

FIG. 2 illustrates a flow diagram of a process executed in anomaly-detection system, according to an embodiment. The method 200 includes steps 210-250. However, other embodiments may include additional or alternative execution steps, or may omit one or more steps altogether. The method 200 is described as being executed by a server, similar to the analytics server described in FIG. 1A. However, one or more steps of method 200 may also be executed by any number of computing devices operating in the distributed computing system described in FIG. 1A. For instance, one or more computing devices (e.g., end-user devices) may locally perform part or all the steps described in FIG. 2.

Using the methods and systems described herein, the analytics server may identify discontinuities and/or other anomalies within different joining using the first AI model. The analytics server may then use the second AI model to identify a recommendation or a solution to rectify the "root cause" causing the discontinuity or the anomaly. As used herein, an anomaly may refer to any reason that an expert or a reviewer would deem a joining as having a quality that is unsatisfactory. For instance, in some configurations, a joining may not have a discontinuity. However, the joining may be anomalous because its quality may not be satisfactory. In another example, a joining may be anomalous because it lacks quality because the surface was not clean (root cause). Therefore, anomaly may mean quality in some embodiments. However, not all anomalies cause quality issues. For instance, a joining may have anomalous data but it may be a joining that has satisfactory quality. Accordingly, quality may refer to the outcome of the joining process. Anomaly in the process can cause quality issues or can result in normal and high quality joinings. In some embodiments, if there is no anomaly in the measured data, the analytics server may not identify quality issues.

To identify whether a joining has quality that's not satisfactory (i.e., anomalous), analytics server may train the first AI model using the methods and systems described herein. For instance, the analytics server may generate a training data set that includes anomalous and non-anomalous joinings. For instance, previously performed joining and/or simulated joinings that are performed in a laboratory may be reviewed by expert and may be labeled as anomalous or non-anomalous. In some configurations, destructive testing may be used to identify discontinuity and/or anomalies associated with different joinings. In some embodiments, the root cause may also be identified. Quality issues may be labeled and defined by the reviewers using NDT guidance or visual inspections. In contrast, a root cause causing the anomaly (or bad quality) as the underlying reason that the anomalous joining has been identified (e.g., finger print, oily surface, dust are non-limiting examples of root causes). Specifically, if quality of a joining is identified to be unsatisfactory, the expert or reviewer may label the joining as anomalous. As a result, the first AI model may identify the corresponding joining data associated with the anonymous anomalous joining and may train itself such that it can identify hidden patterns and commonalities among anomalous and non-anomalous joinings.

The first AI model (when trained) may then retrieve joining data associated with a new welding (e.g., voltage, current, lift, force, displacement, acoustic noise data, and/or the like) and may determine a likelihood that the new joining has an anomaly and/or a discontinuity.

At step 210, the analytics server may receive a plurality of attributes corresponding to a joining. A non-limiting example of data received by the analytics server may include weld log or welding log data. In stud welding, a heating element (e.g., electric arc) is used to heat the end of a stud or electrode and a portion of the base metal. When the stud end is placed at the end of the joining machine (whether manual or automatic), pressure is used to attach the stud to the underlying metal. Because the area of the stud is relatively small, stud welding can be performed in a short period of time (e.g., 50-200 milliseconds). The heat generated in conjunction with the pressure allows the stud to fuse to the underlying metal sheet.

The joining machine may transmit a file containing the weld log to the analytics server where the analytics server parses the data within the weld log to identify each attribute collected by the sensors. The weld log may be sent to the analytics server in real time or in batches, In addition to the above-described parameters, the analytics server may also use material thickness, material property for both the studs and the underlying metal sheets. For instance, the analytics server may retrieve data (e.g., diameter, thickness, and other physical dimensions) associated with the stud used and the underlying metal sheet. The analytics server may also retrieve the material property associated with the stud and the underlying metal sheet (e.g., whether the stud or the underlying metal sheet is aluminum or steel). The analytics server may also consider data associated with the joining machines, such as duration of work, number of welding performed, and the like.

FIG. 5 depicts an example of weld log 500, which include data retrieved from one or more sensors associated with a joining machine. The weld logs 500 may include a timestamp and the corresponding joining attributes, as depicted. The analytics server may parse the weld log received from the joining machine (or other data sources) and may extract the above-described attributes. As will be described below, the analytics server may then apply the welding attributes/ data to one or more AI models to predict a likelihood of discontinuities and anomalies of the joining. Additionally or alternatively, the analytics server may retrieve data associated with the material used for the joining. Furthermore, when the welding is performed manually, the analytics server may retrieve hand movement data associated with the welder (e.g., how the welding apparatus was handled) obtained using various monitoring sensors.

The data received may also include acoustic noise, voltage, current, and/or life. Using the information received in the step 210, the analytics server may identify a likelihood of discontinuity and/or other anomalies. As used herein, anomalies, may also refer to a joining that does not have good quality. For instance, a joining may not include a discontinuity. However, the joining may include an anomaly and the joining may not have the appropriate quality. "Quality" may be defined by various standards. For instance, during training, a human reviewer may indicate (label) the training dataset (e.g., data corresponding to a particular joining) as good or bad quality. In some embodiments, the joining may satisfy various traditional thresholds, such as visual inspection where no discontinuity is identified. However, the AI models may indicate that (based on various attributes) the joining may not have the right quality (based on how the model was trained). Because the AI model(s) use multivariate analytical methods, quality may be defined in more sophisticated manner than applying one or more thresholds. Therefore, the quality of a weld may be defined as a multi-variate conditions corresponding to multiple attributes and patterns of attributes of a joining.

Figure 3A:
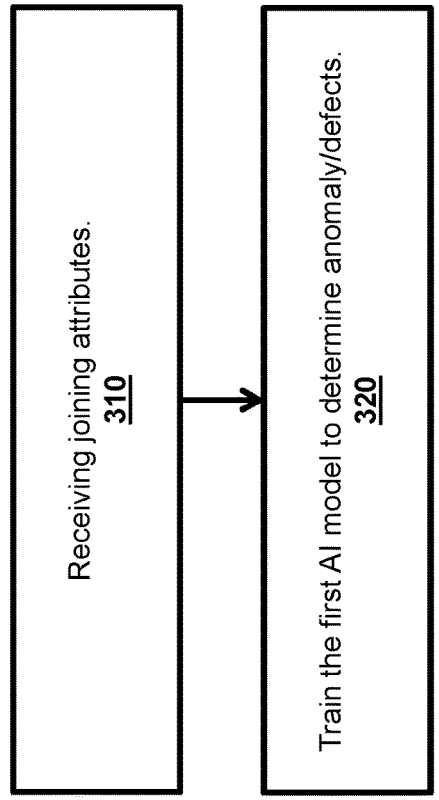
FIG. 3A illustrates a flow diagram of a process executed in an anomaly-detection system, according to an embodiment.
Figure 3B:
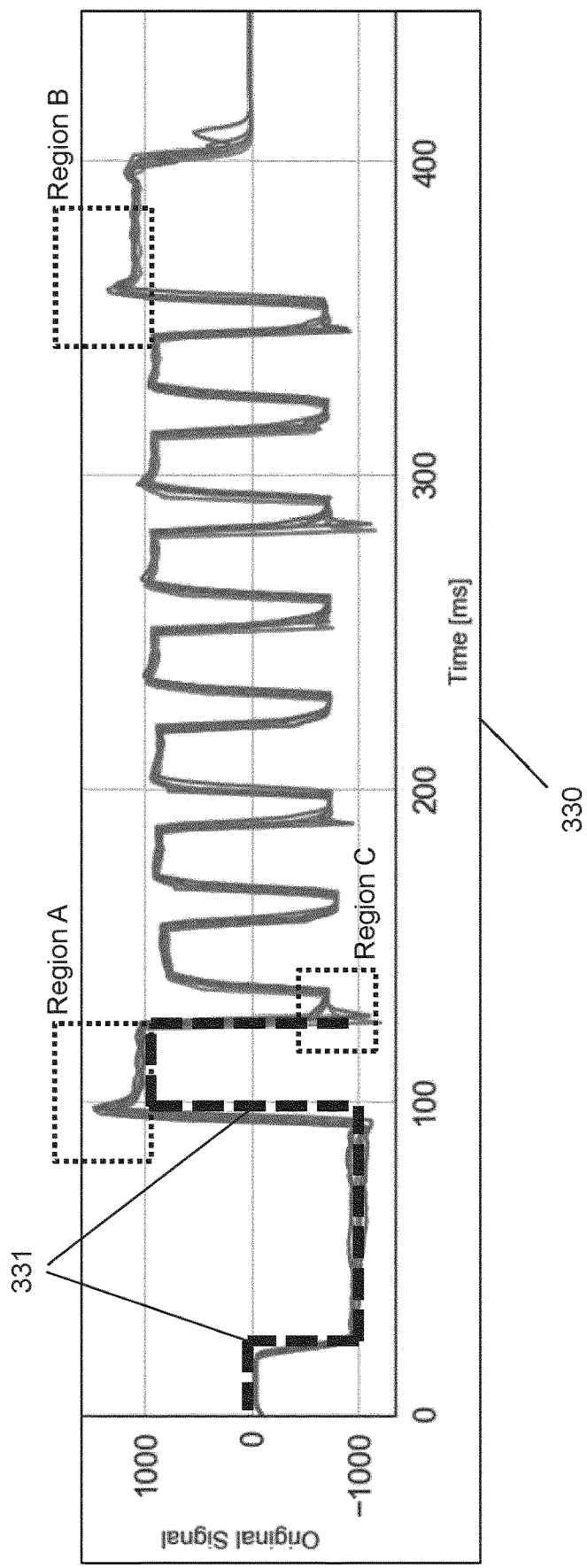

Referring back to FIG. 2, at step 220, the analytics server may execute a first AI model to identify one or more attributes associated with at least one discontinuity or anomaly associated with the joining, the first AI model being trained based on previously performed joinings and their corresponding discontinuity/anomaly attributes. The analytics server may execute the first AI model using one or more of the attributes received at step 210. The first AI model may be previously trained, such that the first AI model ingests joining attributes received and generates a likelihood of discontinuity and anomalies associated with the joining. Method 300 of FIG. 3A is a non-limiting example of how the analytics server trains and prepares the first AI model using joining data. The analytics server may train the first AI model, such that at the time of executing the step 220, the first AI model is already trained. As will be described below, the analytics server may continuously retrain, recalibrate, and revise the first AI model in order to improve its accuracy.

FIG. 3A illustrates a non-limiting example of training the first AI model, in accordance with an embodiment. At step 310, the analytics server may generate a training dataset used to train the first AI model. The training dataset may include previous joining data. For instance, the analytics server may retrieve data associated with previously performed joinings and their corresponding weld logs (or other joining data). Additionally or alternatively, the analytics may also retrieve discontinuity and anomaly data known to be associated with the joinings. The analytics server may aggregate the retrieved data and generate a training dataset. Using the training dataset, the analytics server may train the first AI model, such that the first AI model can analyze a new dataset and identify possible discontinuities and anomalies.

Additionally or alternatively, the analytics server may include data associated with the material used for the joining within the training dataset. Furthermore, when the joining is performed manually, the analytics server may retrieve hand movement data associated with the welder (e.g., how the joining apparatus was handled can be monitored using various sensors).

In some configurations, the analytics server may refine the data retrieved from the joining machine to improve the quality of the training dataset. For instance, a sensor within a joining machine may collect data with a high frequency (every ten milliseconds). The analytics server may average the data received, such that the data used to train the first AI model represents fewer samples (or a lower frequency). For instance, the analytics server may average multiple readings, such that the data indicates average readings for one-minute time windows.

In some embodiments, the same underlying metal sheet may be subject to multiple joinings at the same time. For instance, multiple automatic joining machines may perform simultaneous (or near simultaneous) welding on the same car frame. As a result, the data received from one or more sensors may need to de-noise. For instance, because two joining machines perform joinings on the same car frame, current and voltage retrieved from the sensors may need to be adjusted accordingly. The analytics server may first determine whether a timestamp of joining is associated with any other joinings. If so, the analytics server may bifurcate and de-noise the data received from one or more sensors. Additionally or alternatively, the analytics server may update the data record to indicate that the joinings were performed at the same time. Using this data, the first AI model can train itself accordingly.

At step 320, the analytics may train the first AI model. The first AI model may be trained based on previous joining data. For instance, the analytics server may train the first AI model using previously identified discontinuities and their corresponding weld log data. The analytics server may train the first AI model using a supervised method where the discontinuities and their attributes are fully labeled. For instance, the training dataset may be labeled, such that the first AI model can identify the discontinuities and other anomalies within a joining. The first AI model can also connect the labeled discontinuities or anomalous joinings with their corresponding joining attributes (e.g., welding logs). Using various AI training techniques, the first AI model may identify hidden patterns within the data, such that the first AI model can identify new discontinuities given a new set of weld log data.

Additionally or alternatively, the analytics server may use an unsupervised method where the training dataset is not labeled. Because labeling the data within the training dataset may be time-consuming and may require vast computing power, the analytics server may utilize unsupervised training techniques to train the first AI model.

The analytics server may retrieve attributes associated with previous joinings. Specifically, the analytics server may retrieve weld log data associated with previously performed joinings. In some configurations, the analytics server may retrieve additional data associated with the joining, as discussed above. Therefore, data used to train the first AI model is not limited to the weld log data.

Referring now to FIGS. 3B-K, non-limiting examples data used to train the first AI model is depicted. The analytics server may reduce the dimensionality to size (and material) of the stud, time, voltage, current, and lift. As used herein, voltage and current may refer to continuous and periodic monitoring that is performed by one or more sensors associated with the joining machine and/or otherwise associated with the joining. For instance, as depicted in FIG. 1B, the joining machine may include various sensors configured to monitor voltage and current uses to perform the joining. These sensors may transmit voltage and current data, as depicted in FIG. 3D. Charts 334 and 336 visually depict current, voltage, and stud path associated with a welding cycle (or any other joining).

Having the correct weld current and voltage for stud welding may be an indicator regarding how well the stud welding has been performed. This information may also be used to evaluate other joinings. As discussed above, the joining machine may use electrical arc to generate heat and fuse the stud to the underlying metal sheet. Therefore, gauging electric attribute of the joining may be used to train the first AI model. For instance, chart 330 (FIG. 3B) indicates signal received from a sensor. The chart 330 depicts an aggregated series of signals received were the signal path is overplayed upon each other. Ideally, the depicted cycles follow a straight line, as depicted in the line 331. However, certain signal anomalies may occur, as depicted in regions A-C.

Figure 3C:
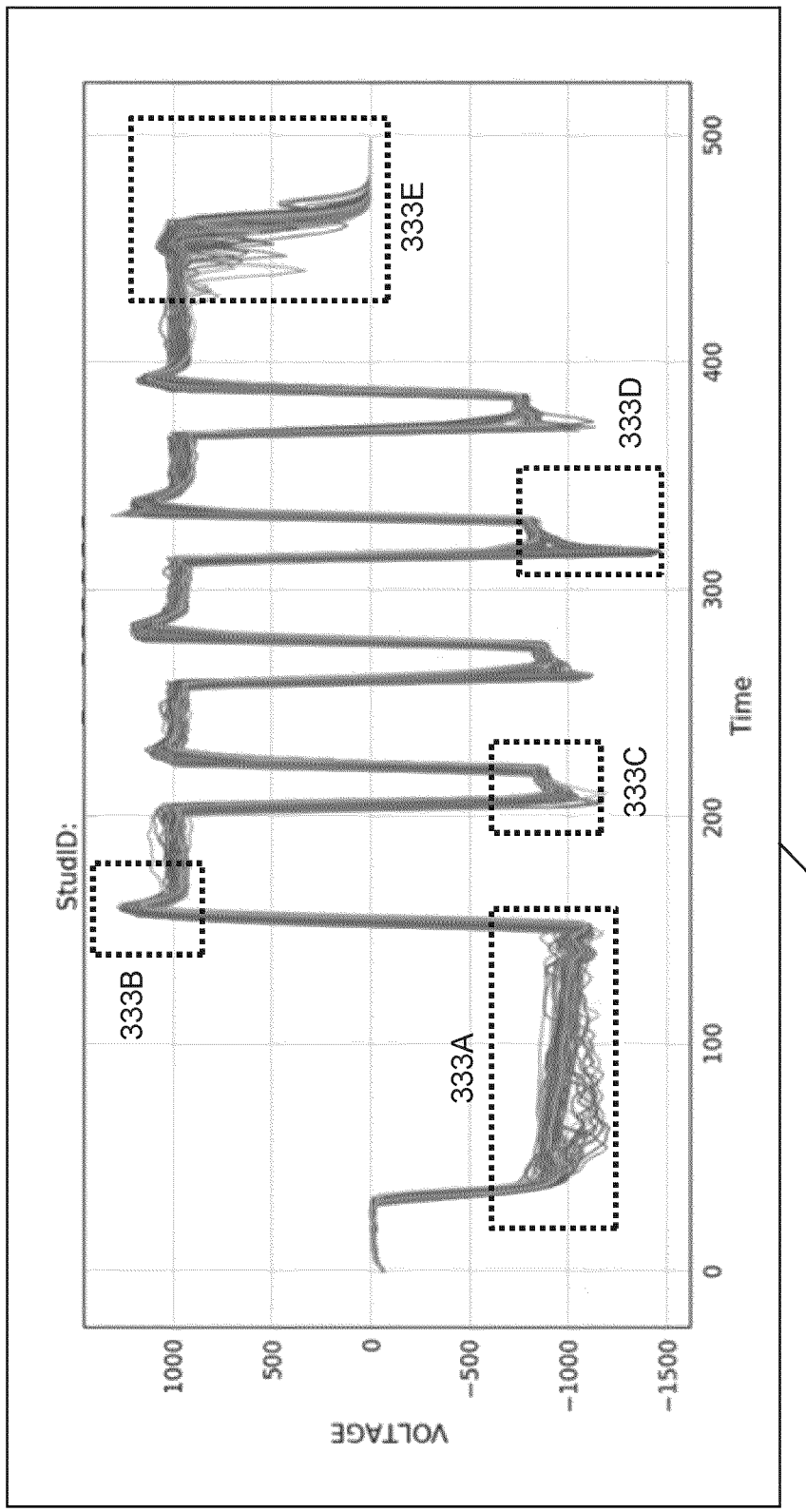

Referring now to FIG. 3C, the chart 332 visually represents voltage (Y-Axis) and time (X-axis) for a particular joining. As depicted in chart 330, the AI model may analyze the data to determine whether the dynamical response best fits a predetermined type of curve (identified anomalous shapes outside of the scope reasonable performance of the machine). The predetermined type of curve may refer to how a signal (in this case voltage) rapidly increases or decreases (e.g., regions 333A-E). Depending on each range, the first AI model can classify the surface hardness, cleanliness, arc "focus", arc quality, and weld quality.

The analytics server may also include lift values associated with the joining within the training dataset. "Lift" or "lift height" is the distance the weld stud is raised above the base material during the arc process. The joining machine may include one or more sensors that can monitor and transmit lift values for each joining. Below is a non-limiting example of data record indicating joining attributes:

| Stud Base Diameter, in. | Stud Base Diameter, mm. | Joining Current A | Joining Time, Seconds | Lift, in. |
|---|---|---|---|---|
| ¼ | 6.4 | 450 | .18 | 0.062 |
| 5/16 | 7.9 | 500 | .31 | 0.062 |
| ⅜ | 9.5 | 550 | .45 | 0.062 |
| 7/16 | 11.1 | 675 | .84 | 0.062 |

Figure 3E:
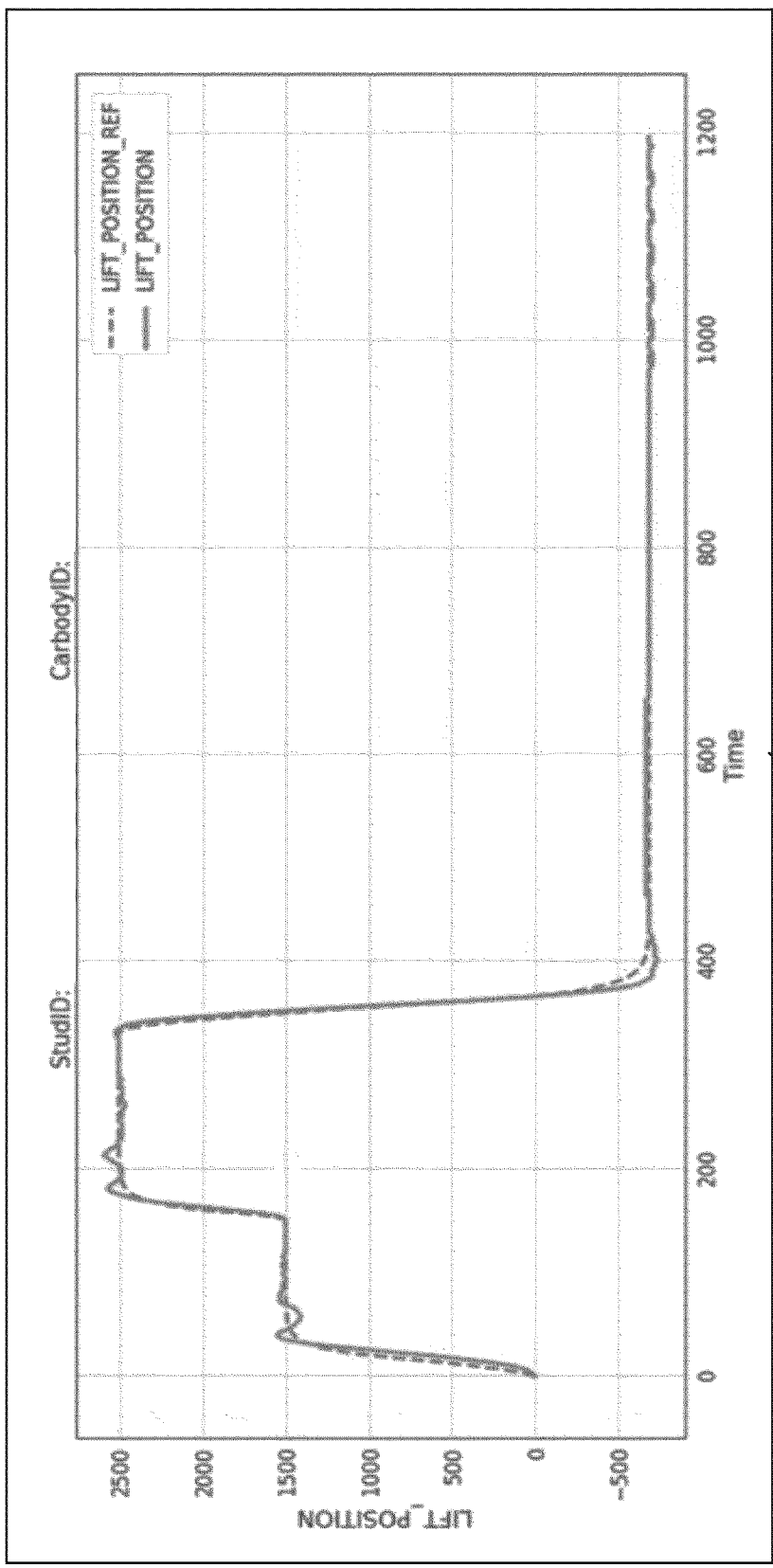

Additionally, as shown in FIG. 3E, chart 338 indicates data received from one or more sensors that represent lift associated with a joining (Y-Axis) in light of joining time (X-Axis). The first AI model may analyze the training dataset to determine a response of the joining system to the reference (command signal) which is impacted by the various environmental and base material properties.

The first AI model may use a combination of time-based, frequency-based (e.g., Fast Fourier Transform or FFT), and hybrid (wavelet) on each "step" and on all "arc shape" to classify the joining as a whole, and analyze each segment separately to isolate data corresponding to different steps of the joining and time that may correspond to a defect. As a result, the first AI model may not only define the quality of each joining, but also the root cause of the defect and its timing, as well as degradation of the machine (e.g., feeder, electrical, and/or linear motor) over the time.

Figure 3G:
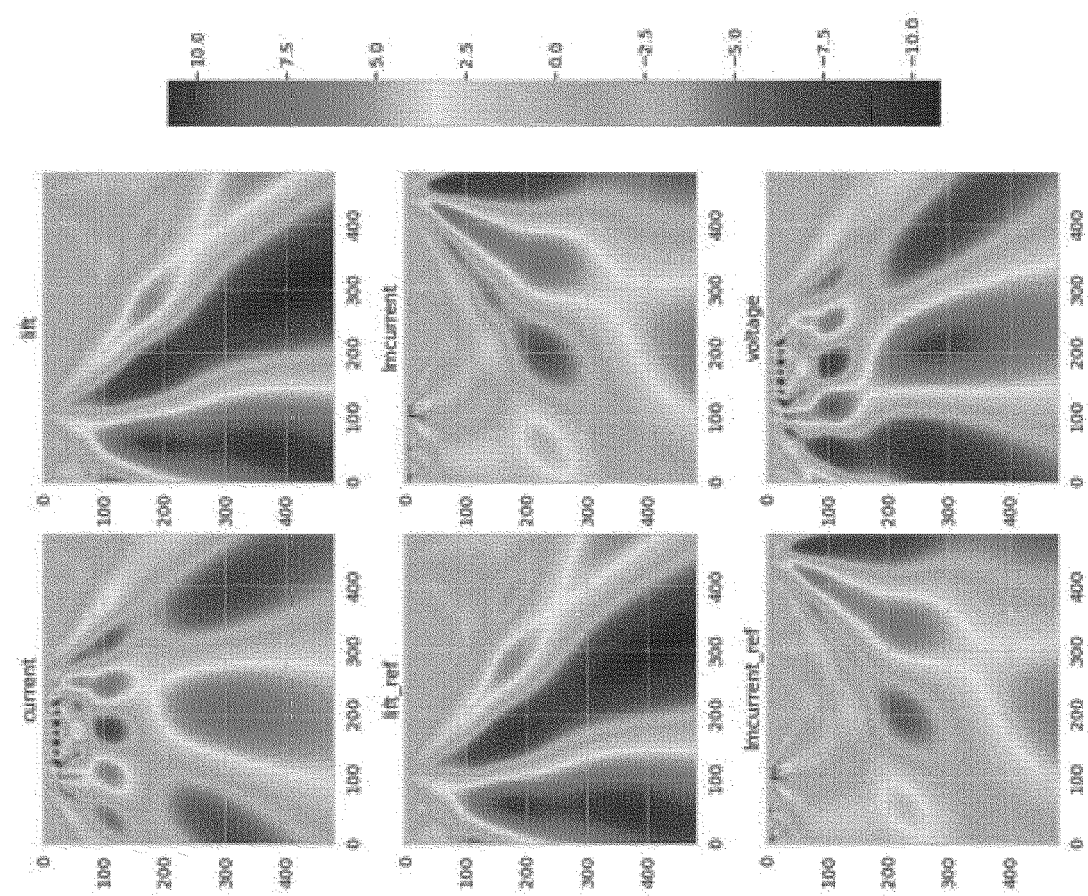

To achieve this, the first AI model may transform the data received into continuous and/or discrete time transformation wavelets. These wavelets may represent a time-frequency transform, which can allow easy analysis of the signals. These wavelets are depicted in FIGS. 3F-G. For instance, chart 340 depicts joining voltage and chart 342 illustrates its corresponding wavelet. Chart 344 illustrates joining current and chart 346 its corresponding wavelet. Chart 348 illustrates joining lift and chart 350 its corresponding wavelet. Moreover, FIG. 3C illustrates other examples of wavelets generated by the first AI model.

The analytics server may train the first AI model assuming that surface quality of the underlying metal sheet (work piece) has an impact on quality of each joining. Because surface quality of the metal sheet cannot be easily (e.g., directly) measured, the analytics server may use indirect methods, such as by analyzing the "response-to-reference" indications using voltage and lift data. Because voltage data does not have a reference, the analytics server may generate a baseline using a statistical model and use the baseline as a reference. In contrast, current values include a reference point, which the first AI uses as the baseline to train itself.

The training dataset used to train the AI models discussed herein (e.g., the first AI model) may include acoustic noise from previously performed joining. For instance, when performing a joining (e.g., traditional welding or stud welding or riveting) in a laboratory or in non-laboratory situations where attributes of the joining is being monitored to train the AI model(s), a sensor may monitor and capture the acoustic noise generated as a result of the joining (e.g., stud welding). The AI model may ingest the acoustic noise as signal input to train itself using the methods and systems described herein. The acoustic noise may be a by-product of the physical interaction of material, current (voltage) and lift and could be used instead of direct measurements of voltage, current/lift for welding. Therefore, in some configurations, the AI (models) may use the acoustic signal to impute voltage, current, and/or life to predict an anomaly associated with a joining. Additionally or alternatively, the AI models may use the acoustic noise in addition to voltage, current, and/or lift to predict a likelihood of anomaly.

The training dataset may also include labeling associated with different joining regarding whether the joining has quality that satisfies a threshold. Using destructive testing and/or a reviewer, the training dataset may included labeling data indicating quality of the joining.

The first AI model may then cluster the data points in a quality risk space. The first AI model may use various clustering methods to group data points without pre-defined physical interpretation of data. The clusters can then be re-grouped into other groups with pre-defined physical interest.

The analytics server may use various clustering techniques (e.g., K-means clustering, Gaussian mixture model clustering (GMM), density-based spatial clustering (DBSCAN), and/or spectral clustering) to cluster the data. In some configurations, the analytics server may execute all four methods and select the clustering method that produces better results.

The analytics server may then calculate a distance between the clusters. The analytics server may use various existing methods to calculate the distance between the clusters. The analytics server may then adjust the number of clusters and re-cluster the data. The goal of adjusting the number of clusters and re-clustering is to reduce the sum of distances between clusters. For instance, if the clusters have at least one distance that satisfies a threshold, the analytics server may adjust the number of clusters (reduce the number of clusters by one) and iteratively re-cluster the data. Because the number of clusters is reduced, the re-clustering produces bigger clusters (certain clusters will be combined and will include more data points). The analytics server may iteratively repeat the above-described process until the clusters are optimized. As a result, the analytics server identifies an optimum number of clusters that represent differences within the data. Therefore, the number of clusters may differ based on the data ingested by the first AI model.

Figure 3H:
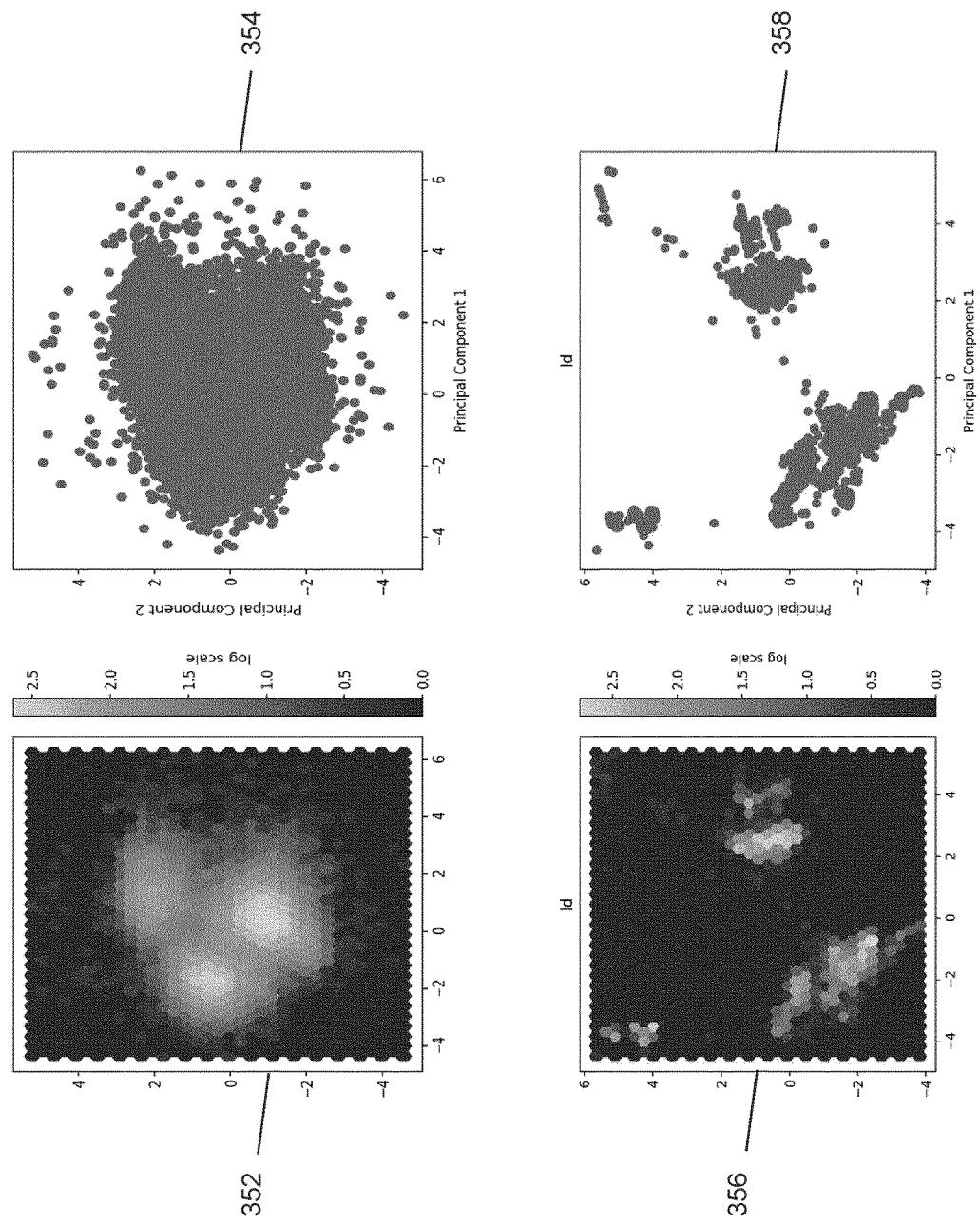

As shown in FIG. 3H, charts 352-354 visually illustrate how the first AI model clusters the data points. For instance, chart 354 illustrates raw data points and the chart 352 illustrates how data can be clustered into three main clusters. Similarly, data points illustrated in chart 358 can also be clustered (e.g., chart 356).

Figure 3I:
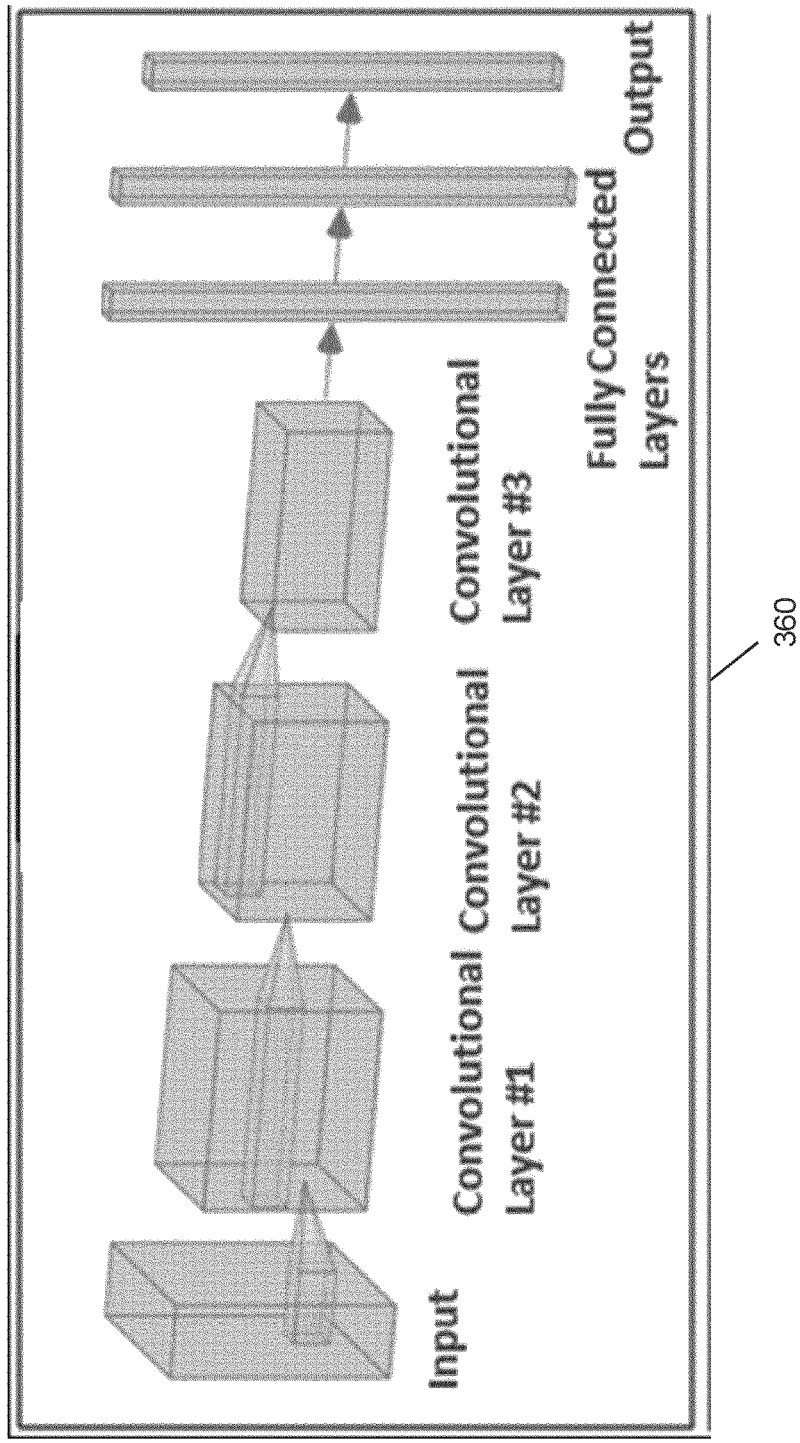

The first AI model may be a neural network that includes multiple layers, as depicted in the neural network 360 of FIG. 3I. The middle layer of the neural network 360 may correspond to the cluster generated using the methods described above. The last layer may correspond to the predefined groups based on user-input or specific process parameters (e.g., it can be various defined Fault Modes (e.g. lack of fusion).

Figure 3J:
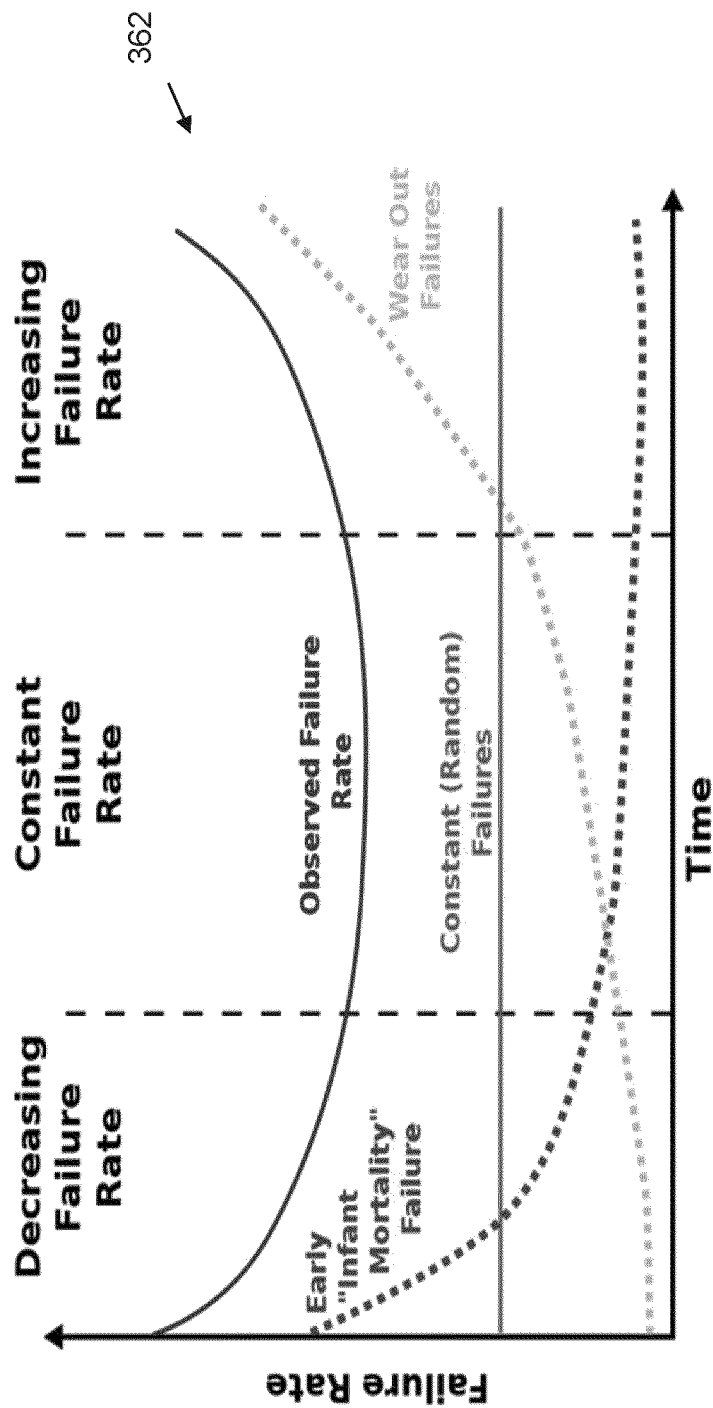

The first AI model may also analyze the device (e.g., joining machine) itself. Referring now to FIG. 3J, the chart 362 illustrates outcome of the AI model's assessment around a particular joining machine or device. As depicted, the model may use weld qualities over larger numbers to estimate the state of the device. In some embodiments, the recommended actions (generated by the second AI model) may use this chart to preauthorize based on a phase/state associated with the device within the chart 362.

Figure 3K:
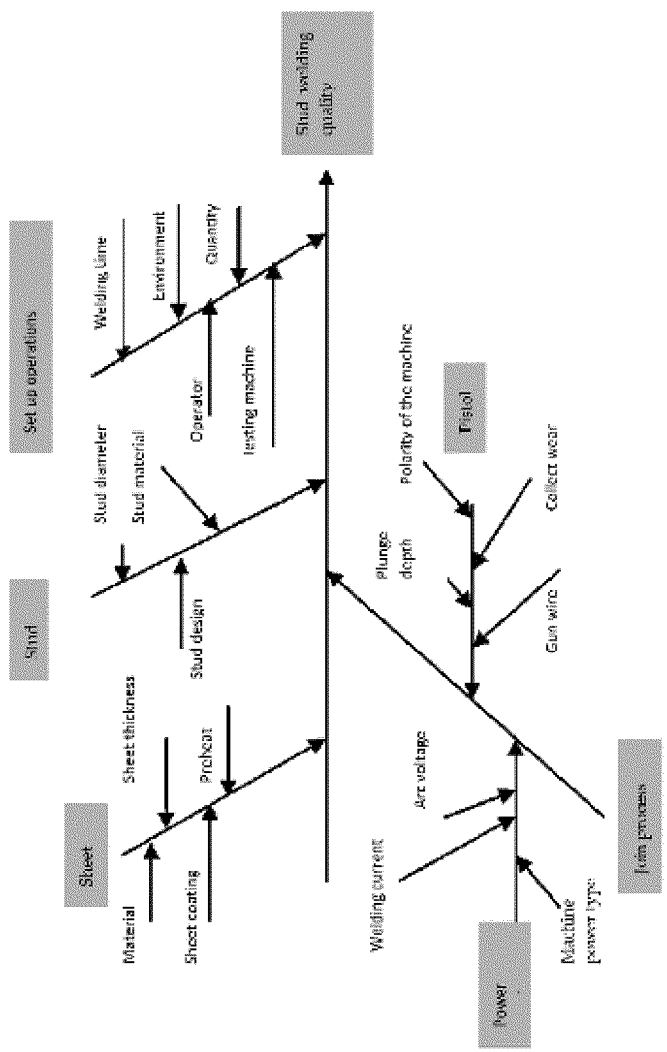

Using the methods and systems described herein, the first AI model may receive weld log data associated with a new joining and determine a likelihood of presence for different anomalies (also referred to herein as root causes) within the joining. Non-limiting examples of root causes are depicted in FIG. 3K. Other non-limiting examples of root causes may include dirty metal sheet (e.g., underlying metal sheet, such as the car frame, that include corrosive material, dust, fingerprint, moisture, oil, and the like).

As described herein, the analytics server may train the first AI model using lab data. Because lab data can be de-noised and decoupled from interfering data that could potentially produce faulty results, the analytics server may use a supervised training method. The analytics server may then execute the trained first AI model using plant (factory) data to predict discontinuities and anomalies. Because data analysis must be done at a rapid pace, the analytics server may transform the plant data to resemble lab data. This may allow the first AI model to produce results that are more accurate.

Referring back to FIG. 2, the analytics server may apply the first AI model to generate a score for different passes and/or different joinings. The method 200 may then execute step 250. In the alternative, the analytics server may continue with executing the steps 230 and 240. In some embodiments, the analytics server may execute the steps 230-250 entirely.

At step 250, the analytics server may present the one or more attributes associated with at least one discontinuity and/or anomaly associated with the joining. Referring now to FIG. 6, chart 600 visually depicts different scores calculated for different joinings. The X-axis in the chart 600 may represent different joinings (different cycle IDs or different layers). The Y-axis may represent different root causes associated with the joining's predicted anomaly. The chart 600 may depict the scores calculated via executing the first AI model. For instance, column 602 represents different scores generated by the analytics server (via executing the first AI model) for joining number 1 (cycle ID No. 1) where scores calculated for different root causes (e.g., anomalies) are shown. Therefore, each score depicted in the chart 600 may correspond to a joining's particular anomaly.

Each score may refer to a particular root case (i.e., reasons giving rise to a detected anomaly). For instance, an anomaly root cause may correspond to existence of fingerprint (or corrosion) on the metal sheet. Another anomaly root cause may correspond to existence of oily surface; another anomaly may correspond to faulty robot arm and/or crossed wires, and the like.

For instance, column 602 indicates that the analytics server (first AI model) has detected seven scores for seven different anomalies associated with joining number 1 (seven different likelihoods each corresponding to different root causes). As depicted, some scores are low. For instance, the first AI model has identified low likelihood of anomalies (root cause issues) for the cycle ID No. 1 (0.24, 0.49, 0.49, 0.49, 0.24, and 0.49 respectively). However, the first AI model has calculated a higher likelihood of presence for anomaly/root cause number 23 (1.2) for the same cycle ID number.

As depicted, each indicator may also include a number that corresponds to the score calculated. For instance, the indicator 606 identifies that the analytics server has calculated a score of 3.5 and the indicator 604 identifies a score of 1.3. This indicates a high likelihood that the second joining may have an anomaly (e.g., oily surface or root cause ID No. 14) and a moderate chance of the same anomaly being associated with the third joining, while the first joining did not have the anomaly.

The analytics server may use various predetermined scales for the scores calculated. For instance, the analytics server may display a percentage likelihood or may use any predetermined and revisable scale best suited for the end-user (e.g., scale of 1-5 or 1-10). Furthermore, the analytics server may use heat mapping and color-coding to visually indicate zones with high probability of discontinuity. In some embodiments, the analytics server may display the chart 600. Additionally or alternatively, the analytics server may display predetermined text information corresponding to the calculated score. For instance, the analytics server may execute a predetermined look up table to identify text corresponding to different score ranges and display the text accordingly. For instance, when the calculated score satisfies a threshold (e.g., more than 80% likelihood of a discontinuity being present), the analytics server may display a predetermined text (e.g., "high risk").

Various attributes of the chart 600 may be customizable and revisable by the end-user viewing the chart 600. For instance, the end-user may revise scales, color coding, placement of each indicator. In some embodiments, the end-user may input a threshold and instruct the analytics server to filter the indicators accordingly. For instance, the end-user may instruct the analytics server to display only those joining scores indicating a likelihood of a discontinuity greater than 50% (or any other threshold defined by the end-user). The end-user may also revise and/or filter different joinings, such that the chart 600 only includes relevant and requested information.

Referring now to FIG. 7, another non-limiting example of anomaly visualization is presented, in accordance with an embodiment. The graphical user interface (GUI) 700 represents a GUI displayed on a computer of a job site computer (e.g., 120a depicted in FIG. 1A). Using the GUI 700, the end-user can identify faulty joining machines and an extent (frequency) of how faulty each joining machine is within a predetermined time window.

The GUI 700 may include various rows and columns, wherein each column represents a predetermined time period. The depicted embodiment includes columns that identify a week (e.g., week number 1 or 2). For instance, column 706 corresponds to all discontinuity and anomalies detected for the joining machines (identified in the section 704) within week number 1. However, the end user can interact with the input elements 702 to customize the GUI 700 (e.g., change time windows). Each row within the GUI 700 may indicate a specific joining machine. For instance, row 708 indicates anomalies detected for the stud type SWB802 performed by joining machine AS73-305TSB301. The row below the row 708 may indicate anomalies detected for the same joining machine performing different stud type welding.

Using the above-described customizable columns and rows, the end user can gauge different joining machine's performance. For instance, the analytics server has identified 46 total anomalies associated with the joining machine AS73-305TSB301 in week 1. However, this number was reduced to 13 in week 3. When the number of anomalies detected is higher than a threshold, the analytics server may highlight the number of anomalies in a different color to identify a problematic joining machine or process.

When the user interacts with the number displayed within the GUI 700, the analytics server may display detailed data associated with the identified anomalies. For instance, when the end user clicks on the number 46 in the column 706, the analytics server may direct the end user to another GUI that displays specific detail associated with the identified anomalies (e.g., location, timestamp, and/or type of anomaly).

As depicted in GUI 800 of FIG. 8, the analytics server may also display recommended corrective and/or preventive actions. For instance, when the end user clicks on a particular joining machine or a particular series of detected anomalies, the analytics server may display the GUI element 802 that recommend various actions. The analytics server may use the second AI model (described herein) to generate the recommended course of action. As used herein, a course of actions can be remedial, corrective, and/or preventative. The analytics server may also calculate a confidence level associated with the recommended course of action.

Using the depicted input elements, the end user may indicate whether the recommended course of action was accepted, rejected, and/or implemented. The end user may also submit comments regarding the recommended course of actions. As described herein, the analytics server may use the submitted responses and implemented courses of action to recalibrate the second AI model.

Referring back to FIG. 2, at step 230, the analytics server execute a second AI model that receives an input of the one or more attributes associated with at least one discontinuity and anomaly generated by the first AI model and generates recommendation associated with the joining. As discussed above, a recommendation may be a preventative, remedial, and/or corrective action.

Embodiments contained herein describe the second AI model as a separate AI model (different from the first AI model) so that explaining the functionality of each AI model is easier. The methods and systems described herein can be implemented such that a single AI model can act as the first and the second AI models. For instance, a single AI model may identify anomalies and discontinuities and generate a recommendation for the identified anomalies and discontinuities. In other configurations, the functionality described herein can be divided among more than two AI models. Therefore, the methods and systems described herein are not limited to implementations where two AI models are utilized.

Figure 4:
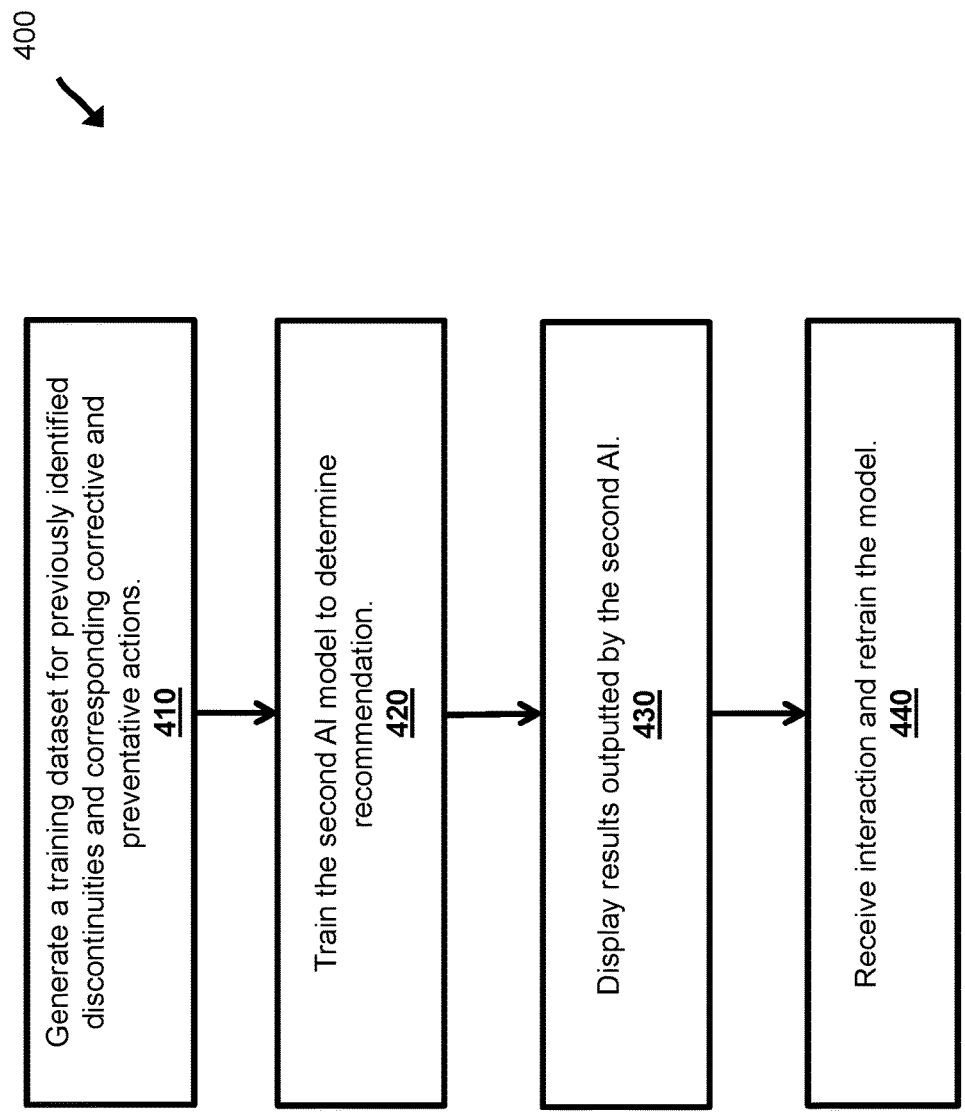
FIG. 4 illustrates a flow diagram of a process executed in an anomaly-detection system, according to an embodiment.

In addition to the data visualization methods described herein, the analytics server may also generate a recommendation to be viewed by the end-user. The analytics server may train and execute the second AI model in according to the systems method 400. FIG. 4 illustrates a flow diagram of a process executed in anomaly-detection system, according to an embodiment. The method 400 includes steps 410-440. However, other embodiments may include additional or alternative execution steps, or may omit one or more steps altogether. The method 400 is described as being executed by a server, similar to the analytics server described in FIG. 1A. However, one or more steps of method 400 may also be executed by any number of computing devices operating in the distributed computing system described in FIG. 1A. For instance, one or more computing devices (e.g., end user devices) may locally perform part or all the steps described in FIG. 4.

The analytics server may generate, train, calibrate, and execute the second AI model that can utilize discontinuities and anomalies (whether they are detected by the first AI model or detected using any other methodologies) generate a recommended action.

In a conventional approach, a trained technician may receive a report indicating that discontinuities and anomalies exist within a joining. The trained technician may then analyze the predicted results and determine a course of action to remedy the predicted discontinuity/anomaly. This manual process includes subjective understanding and skills of the technician. Therefore, actions taken by the trained technician may be highly dependent on each technician's subjective understanding of the welding process and his/her skills. This conventional process has led to many errors, misidentification, and miss characterization of discontinuities/anomalies and/or appropriate actions to be taken.

As described herein, the analytics server may execute the first AI model to identify various attributes of anomalies and discontinuities associated with a joining. The analytics server may use the second AI model to generate and optimize an action to be made to correct the predicted discontinuity and anomalies.

At step 410, the analytics server may generate a training dataset for previously identified discontinuities/anomalies and corresponding actions. The analytics server may train the second AI model using various machine learning techniques and the generated training dataset. Specifically, the analytics server may use a supervised, unsupervised, and/or semi-supervised learning method to train the second AI model. The amount of available data may dictate the type of machine learning techniques used. Once trained, the analytics server may execute the second AI model using the predicted anomalies and discontinuities to generate a recommended course of action to be displayed for the end-user. In some configurations, the recommended course of action may be directly implemented. For instance, the analytics server may cause the joining machine to reconfigure itself (e.g., stop operations).

In a non-limiting example of the analytics server implementing a supervised learning technique, the analytics server may retrieve a historical list of joining anomalies and discontinuity and their corresponding actions taken. For instance, the analytics server may query and retrieve (from internal and/or external databases) data associated with previously performed and inspected joinings. The data may include joining attributes as described herein, and/or attributes of joining errors, discontinuities, and anomalies. The data may also include an action taken by the technicians. For instance, the data associated with a joining may include the weld log associated with that joining. The data may also include known deficiencies of the joining. The data may also include how each deficiency was rectified (e.g., the pressure sensor was replaced, the joining robot (automatic welding machine) was instructed to cease welding and was replaced by another robot, the electrodes producing heat for performing the joining was replaced or fixed, and the like). The analytics server may then train the second AI model in accordance with the data retrieved. Specifically, the analytics server may use the data retrieved as the ground-truth training dataset.

In the supervised learning method, the analytics server may label whether the course of action for the anomalies and discontinuities were designated as the correct course of action. For instance, a human reviewer may review the anomalies and label the datasets. Using various clustering methods and other machine learning techniques, the second AI model may cluster and learn how corrective and preventative actions correspond to identified discontinuities and anomalies of the same joinings. Because the ground-truth dataset comprises historical data known to be accurate, the second AI model may train itself, such that the second AI model identifies how various discontinuities and anomalies are rectified. For instance, the second AI model may identify how a discontinuity having particular attributes was rectified in ways labeled as satisfactory and in ways labeled as unsatisfactory.

As a result, the second AI model may identify patterns that correspond the attributes giving rise to the discontinuities to their appropriate remedy. For instance, the second AI model may identify how voltage/current distribution can identify a malfunctioning part of the joining machine and how it should be rectified.

In the supervised learning method, the analytics server (or a system administrator operating and implementing the training method) may designate the training data as the ground-truth dataset. Using this designation, the second AI model may train itself accordingly (e.g., assume that the recommendation and actions labeled as correct are the appropriate actions to take). The analytics server may train the second AI model such that, given discontinuities and anomaly attributes of a newly performed joining, the second AI can calculate a relationship between the anomaly attributes and several recommended actions and select the best (most optimized) recommended course of actions.

In a non-limiting example of the analytics server implementing an unsupervised machine learning technique, the analytics server may repeat similar steps as the supervised techniques. However, the analytics server may not designate the training dataset as the ground truth. For instance, the analytics server may not identify whether the action taken after identifying the anomaly was correct and appropriate. In the unsupervised learning approach, the analytics server may not label outputs. As a result, the second AI may infer the structures, patterns, and correlations present within the training dataset. The second AI model may use clustering and density estimation techniques to identify the inherent structure of data without using explicitly provided labels, such as provided in the supervised learning method. In operation, the analytics server may input various welding logs and the corresponding remedial actions performed to rectify the discontinuities and the second AI model may train itself using machine-learning techniques, such as K-means clustering.

The analytics server may not be limited to the above-described machine-learning techniques. For instance, the analytics server may use both techniques, wherein the analytics server may label data when applicable and use a supervised training method (e.g., certain portions of the data are labeled as ground truth). If the analytics server cannot verify the accuracy of portions of the data retrieved, the analytics server may use an unsupervised training method. Therefore, the analytics server may use a semi-supervised method to train the second AI model. The analytics server may also utilize reinforcement learning to train the second AI model.

During training, the analytics server may iteratively produce new predicted actions to be taken (recommendations) for the predicted discontinuities. If the characteristics of the recommended action (predicted by the second AI model) do not match the real characteristics of the actions taken (as designated within the training dataset), the analytics server continues the training until and unless the computer-generated recommendation satisfies one or more accuracy thresholds and is within acceptable ranges.

The analytics server may continuously train and improve the first and second AI models using end-user interactions. In some configurations, the analytics server may train the first and/or second AI model using a predetermined portion (e.g., fold) of the ground-truth data. The analytics server may then gauge the and/or second AI model's accuracy (e.g., area under the curve, precision, and recall) using the remaining data points within the training dataset (e.g., second fold). For instance, the analytics server may train the first and/or second AI model using 75% of the ground-truth data. The analytics server may then use the remaining 25% of ground-truth data to gauge the accuracy of the trained second AI model. The analytics server may continuously and iteratively train the second AI model until and unless the second AI model's accuracy satisfies a predetermined threshold.

At step 430, as a part of training the second AI model, the analytics server may execute the second AI model to generate and display a recommended course of action for the predicted discontinuities and anomalies. The analytics server may use the displayed recommended actions (step 430) to further train and revise the second AI model. At step 440, the analytics server may retrain the second AI model based on responses received from the technician. For instance, the technician may submit an input identifying that a predicted course of actions is incorrect or not ideal (e.g., using the input element depicted in FIG. 8). The analytics server may use this information to revise and retrain the second AI model. The analytics server may repeat retraining until and unless the second AI model has reached an accuracy level that satisfies a predetermined threshold.

Referring back to FIG. 2, at step 240, the analytics server may present the course of action generated by the second AI model. The analytics server may displays a GUI that includes the recommended course of action, as depicted in FIG. 8.

As described above, the analytics server may continuously and iteratively train the first and/or second AI models based on end-user interactions and feedback. The analytics server may monitor various end-users' interactions with the identified data to improve the results by revising and retraining the AI models. The analytics server may monitor the electronic device viewing joining discontinuities to identify interactions between the end-user and the electronic device while the electronic device is outputting the results. Based on the end-users interactions (e.g., approval, denial, and/or modification of the results), the analytics server may then revise and retrain the AI models.

The analytics server may track and record details of the user's activity when the end-users interact with any of the GUIs described herein. For instance, when a predicted result is displayed on the user electronic device, the analytics server may monitor to identify whether the end-user has interacted with the predicted results by editing, deleting, accepting, or revising the results. The analytics server may also identify a timestamp of each interaction, such that the analytics server records the frequency of modification, duration of revision/correction.

The analytics server may utilize an application-programming interface (API) to monitor the end-user's activities. The analytics server may use an executable file to monitor the user's electronic device. The analytics server may also monitor the GUIs displayed via a browser extension executing on the electronic device. The analytics server may monitor multiple electronic devices and various applications executing on the electronic devices. The analytics server may communicate with various electronic devices and monitor the communications between the electronic devices and the various servers executing applications on the electronic devices.

In some embodiments, the analytics server may monitor the data packages received and sent by each electronic device to monitor the content of what is displayed, executed, or modified on the electronic device. The communication may take any suitable form. For example, the electronic device may execute an application (e.g., browser extension) having an executable file that enables an end-user to navigate to the GUIs described herein (e.g., web site).

The analytics server may use several techniques to track end-users' activities on the electronic device, such as by tracking browser cookies and/or screen-scraping protocols. In another example, the analytics server may track the end-user activity by periodically retrieving end-users' web browser cookies. The analytics server may transmit cookies to a system database where they can be analyzed (e.g., in batches) to identify end-user activities and interactions.

In some configurations, the analytics server may monitor the electronic device using an executable file (application) installed as a browser extension. The browser extension (executable file) may be executing as a background process of the electronic device. For instance, the browser extension may be transparent to the end-user operating the electronic device. In this way, the analytics server is able to monitor the user's activities without disturbing the end-user's workflow and/or obfuscating the display screen of the electronic device. In some embodiments, the analytics server may activate a monitoring module (e.g., browser extension or executable file) upon outputting the results (e.g., displaying one or more GUIs).

The analytics server may use the data collected/monitored to train the AI models and improve their predicted results. In order to train the AI models, the analytics server may generate new training datasets.

The analytics server may monitor whether an end-user accepted the predicted results. The analytics server may generate a metric corresponding to a frequency that a certain predicted result was accepted, denied, or revised. If the predicted results were accepted, the analytics server assumes that the predicted results were satisfactory to the end-user. If the end-user revised the predicted results, the analytics server assumes that they were partially satisfactory to the user. Finally, if the end-user denied the predicted results, the analytics server assumes that they were unsatisfactory. The analytics server may also generate a metric for how frequently predicted results generated by a model is accepted, revised, and/or denied.

As described above, when an end-user revises a predicted result, the analytics server monitors the revision performed by the user. In some embodiments, the analytics server displays a predicted result on user devices. However, the end-users may feel the need to perform minor corrections before they are satisfied with the results. The analytics server may monitor these corrections and generate training datasets accordingly. For instance, the analytics server may monitor a time duration that each end-user spent correcting the predicted results. The analytics server may assume that a greater monitoring time duration corresponds to less accurate results.

In some embodiments, the analytics server may also monitor the corrections themselves and use this data to train the AI models. For instance, training and revising the machine-learning model may be proportionally implemented based on the end-users modifications. For instance, the analytics server may generate a training dataset that includes the amounts of corrections input by the end-user (e.g., whether the end-user revised the results by 10% or 80%).

The analytics server may always display a prompt requesting end-users' feedback. In some embodiments, the analytics server may display the prompt based on a predetermined frequency (e.g., 50% of instances where a predicted result is displayed). Furthermore, the analytics server may select the end-users receiving the prompt based on predetermined rules. For instance, the analytics server may select the end-users randomly. In some configurations, the predetermined rules may require the analytics server to display the prompt for end-users who satisfy a certain threshold (e.g., only for end-users who have three or more years of experience).

The analytics server may train the first and/or second AI models using the above-described training datasets. The analytics server may use various methods to train the machine-learning model, such as supervised and/or unsupervised learning methods. For instance, the analytics server may use one or more of the following machine-learning approaches to train the AI models: regression, classification, clustering, dimensionality reduction, ensemble methods, neural networks/deep learning, transfer learning, reinforcement learning, and the like. In some embodiments, the analytics server may periodically train the machine-learning model. For instance, the analytics server may collect/monitor end-user interactions and store the corresponding data. The analytics server may then use a predetermined frequency (e.g., once a month or once a week) to train the machine-learning model using the stored training datasets. A system administrator can modify the frequency of the batch training.

Additionally or alternatively, the analytics server may train the AI models when the model produce results that receive feedback that satisfies a threshold. For instance, the analytics server trains the model when the results outputted by the analytics server receive a feedback (e.g., rejection or modification/revision of the results by the end-users) more frequently than a predefined threshold (e.g., 40% of time).

Additionally or alternatively, the analytics server may train the model based on a customized (predetermined) segmentation of training data and/or end-users. For instance, the analytics server may segment the training data before training the AI model. The analytics server may train the AI model in a customized and segmented manner that is meaningfully tethered to the end-user's needs. In a non-limiting example, the analytics server may train the AI models based on feedback received from a selection of end-users. As a result, the analytics server may customize the AI models for a particular job site. This training method allows the machine-learning model to adapt to the particular job site and produce results that are more acceptable to the end-users within that job site.

Additionally or alternatively, the analytics server may also monitor how the discontinuities and anomalies were addressed. For instance, the analytics server may be in communication with one or more sensors that monitor actions performed by the joining machine that are predicted to produce faulty joinings. The analytics server may use this data to further recalibrate the second AI model.

Figure 9:
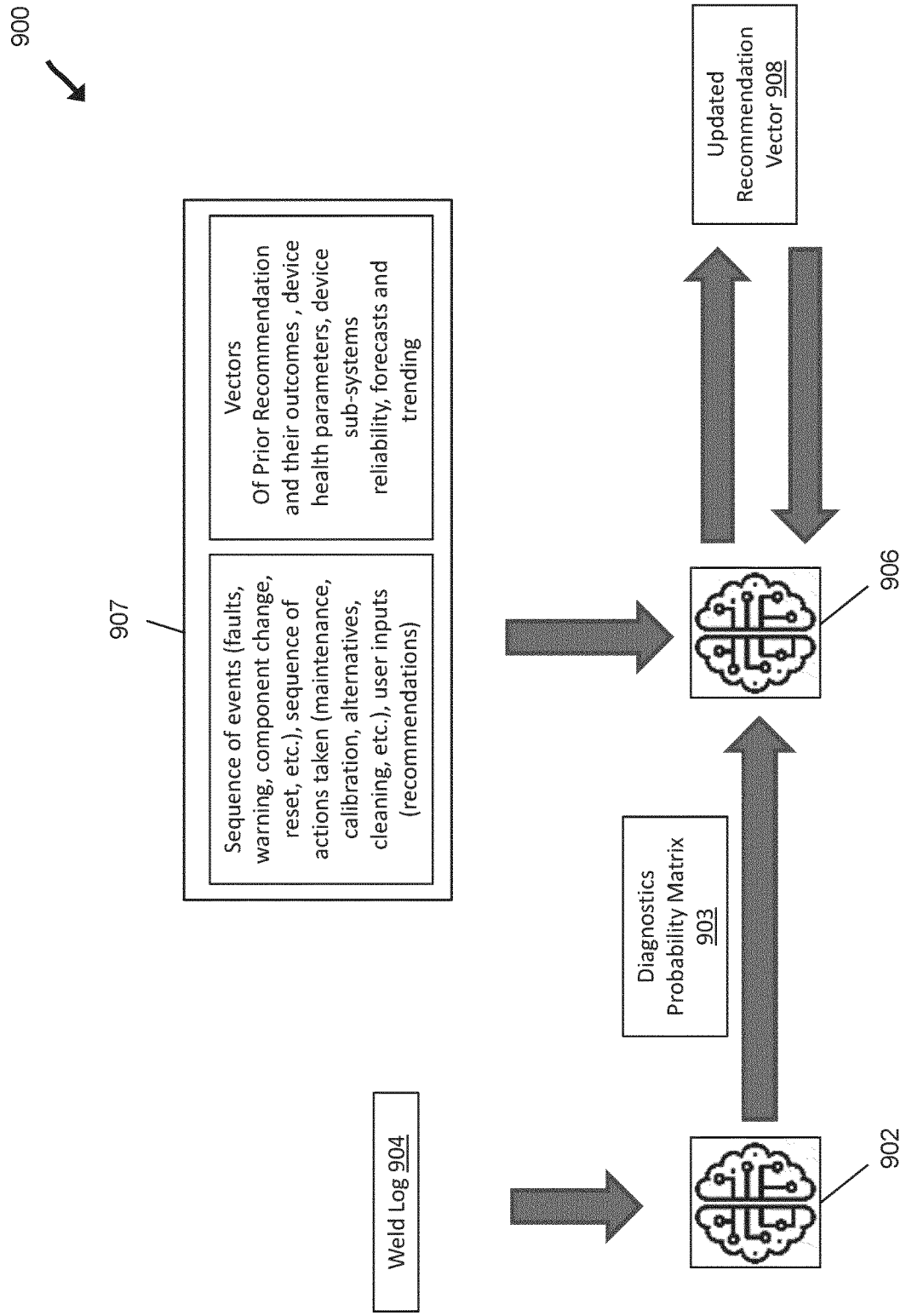
FIG. 9 illustrates a flow diagram of a process executed in an anomaly-detection system, according to an embodiment.

In operation, the methods and systems described herein may work in tandem, as depicted in example 900 (shown in FIG. 9). For instance, the model 902 (the first model) may receive joining data associated with a new joining performed, such as a stud welding performed by a joining machine. The model 902 may receive data (signals) associated with a new joining. The data may be a weld log 904 and may include waveform data for device or fleet of devices and joining cycles performing the joinings. Using the methods and systems discussed herein, the model 902 may ingest and analyze the data 904 for classification/prediction fault code probabilities.

The predictions of the model 902 (e.g., diagnostics probability matrix 903) may be ingested by the model 906 (second AI model). The model 906 may have been previously trained using other diagnostics probability matrices and other training data 907 (sequence of fault events (and corresponding actions taken) and prior recommendation vectors).

The training data may indicate how previous anomalies were rectified. For instance, a computer/server, such as the analytics server, may collect data from scenarios experimented or monitored (e.g., different joinings performed in a lab or monitored in real life). The computer may then incorporate this data using previous performance measurements (e.g., warning, failure, wop rates), and actions taken, from similar devices, and run a dynamic design in experiment (A/B Split) in time. For instance, the model 906 may be trained using the diagnostics probabilities matrix (previously generated by the model 902) and prior recommendations and course of actions taken in relation to those joinings with a high probability of failure (e.g., being an anomaly). The model 906 may perform an "A/B split" across device subsets and recommended actions to experiment with different actions taken on different devices (e.g., joining machines).

Once the model 906 is trained, the model 906 may receive the probability matrix 903 generated by the model 902 and generate/predict a recommendation for one or more anomalies detected within the predicted probability matrix. As a result, the model 906 may generate a new recommendation vector 908.

As depicted, the example 900 may also include a feedback loop that feeds the outcome of chosen/next actions taken and resulting status back to one or both of the models to update both diagnostics probabilities and recommended actions (e.g., relative to root cause) predicted.

The methods and systems described herein can be applied to joining methods other than stud welding, such as riveting. For instance, the first AI model discussed herein can be modified, such that the first AI model can ingest joining data associated with a riveting joining (such as self-piercing riveting, blind riveting of rivets or nuts, or clinch riveting, and other fastening or joining methods that use fasteners (e.g., rivets). In riveting, the rivet may act to join the parts through adjacent surfaces. However, unlike the electrical arc used in stud welding, riveting does not use heat to melt the material to join the surfaces. Therefore, the concepts of voltage and current may not be applicable to the first AI model as discussed herein.

Figure 10:
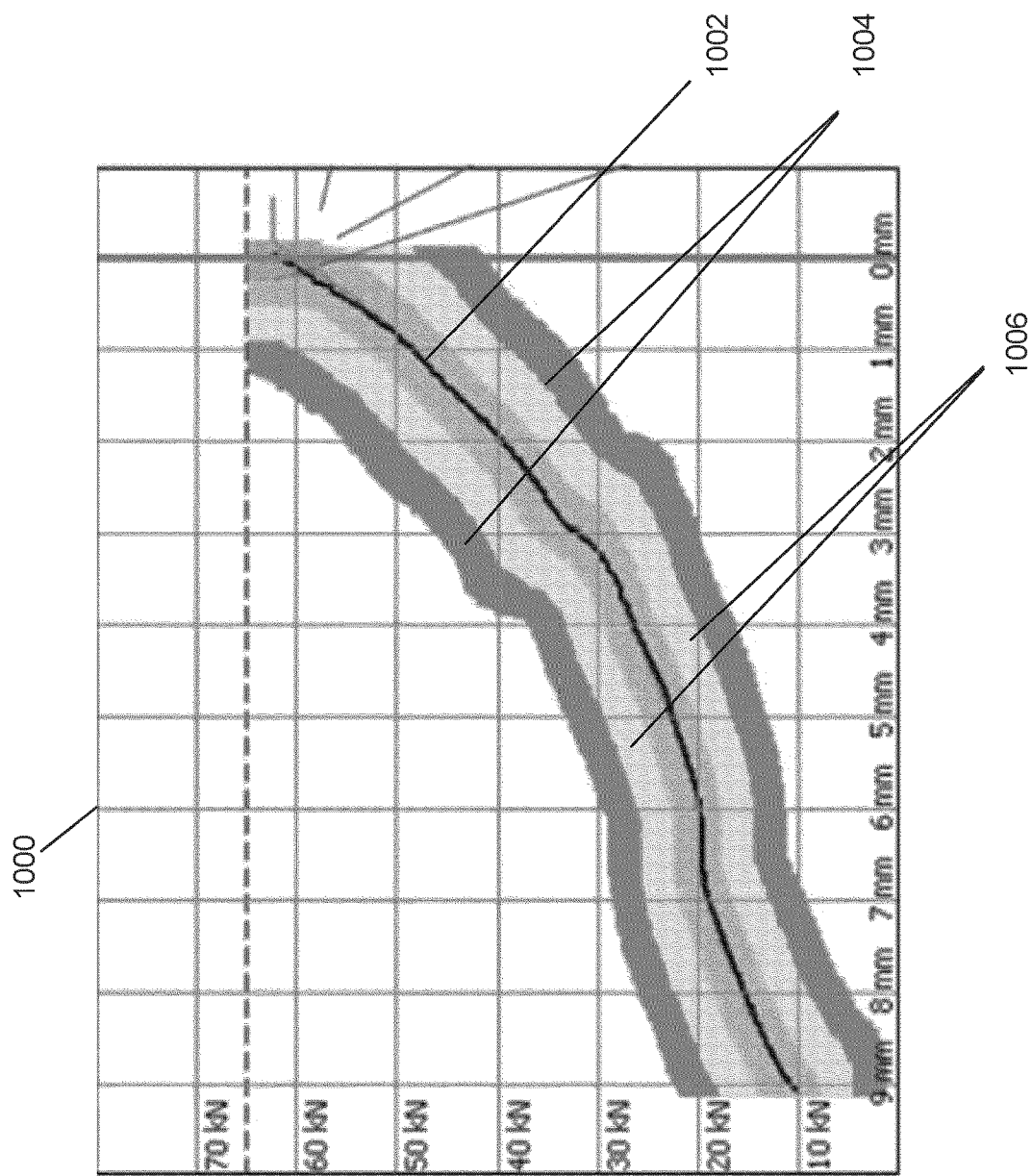
FIGS. 10-11 illustrate joining data associated with riveting joining, according to an embodiment.

Instead of using lift, voltage, and current used in stud welding, the first AI model may use force and movement of the surfaces in a riveting to determine a likelihood of anomaly. For instance, as depicted in FIG. 10, a chart 1000 illustrates joining data monitored using a sensor. The Y-axis in the chart 1000 corresponds to force used in a riveting process (measured KN) and the X-axis in the chart 1000 corresponds to movement caused during the riveting process. In addition to or alternative to the joining data used to train the first AI model, the analytics server may train the first AI model using force and movement of previously performed (in real life or lab-created) rivetings. Specifically, the line 1002 represents different forces and their corresponding movement during a single riveting (joining two surfaces).

Using the methods and systems described herein, the first AI model may train itself using riveting data, such that the first AI model can predict a likelihood that a riveting includes an anomaly. The first AI model may uncover hidden patterns and analyze joining attributes using multivariate analytical methods. Therefore, unlike conventional methods that use thresholds (e.g., illustrated as regions 1004 and 1006), the first AI model may provide a holistic approach to analyzing various data points. For instance, certain anomalies may occur even if the data points are within tolerable thresholds. Moreover, in some other embodiments, satisfying a threshold may not necessarily indicate the existence of an anomaly.

Figure 11:
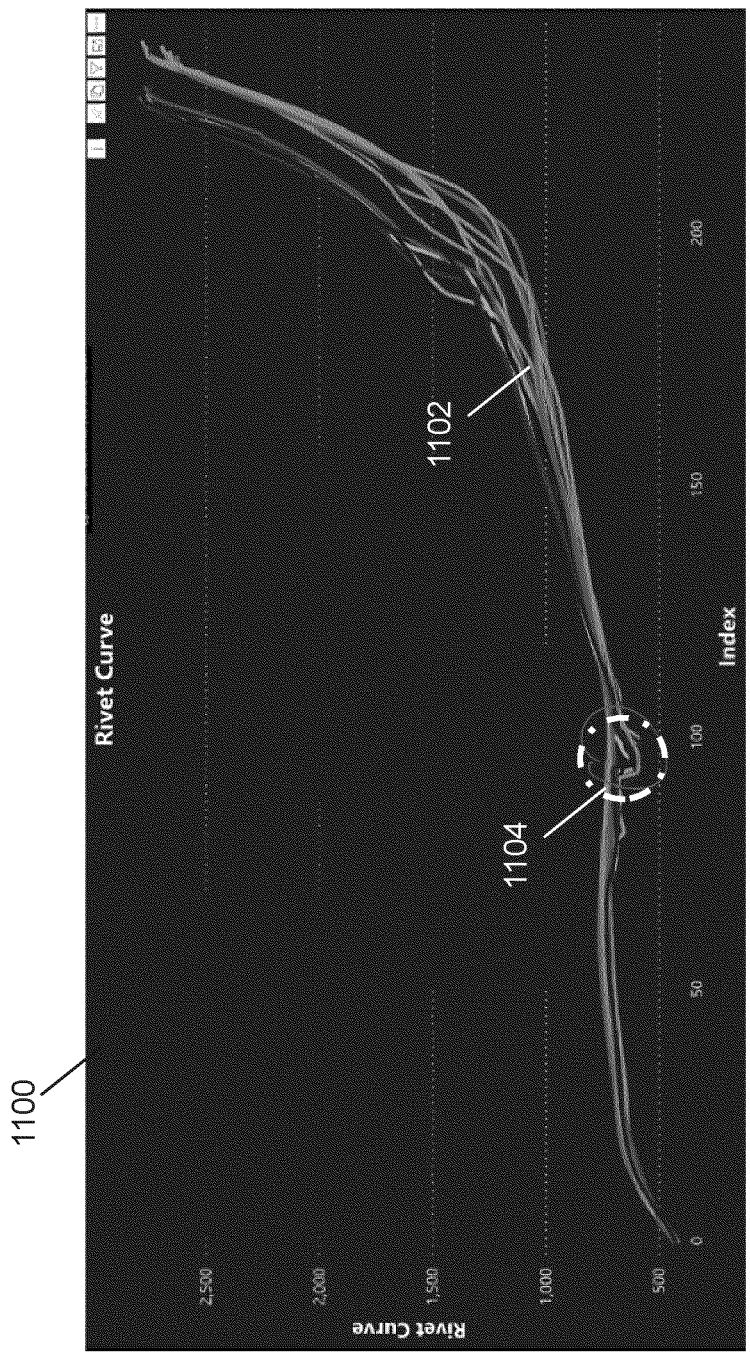

Referring now to FIG. 11, a chart 1100 represents rivet curves for actual joinings performed using the riveting method (functions corresponding to force and movement associated with different riveting). As depicted, the region 1104 depicts that some riveting curves may be outside conventional thresholds. While conventional methods (that use simple thresholds) would indicate an anomalous joining, the first AI model may not.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

We claim:

1. A method of training a neural network to predict a likelihood of at least one discontinuity or anomaly being present within a joining created in a welding system, comprising:
   receiving, by a processor, a plurality of attributes corresponding to the joining;
   generating, by the processor, a training dataset based on the plurality of attributes corresponding to the joining and a plurality of attributes corresponding to previous joinings having at least one discontinuity or anomaly, the plurality of attributes corresponding to previous joinings comprising at least a voltage value, a current value, and a lift value for each previous joining, the lift value indicating a distance a weld stud is raised above a base material during the previous joining;
   training, by the processor, the neural network using the training dataset, the neural network trained to predict the likelihood of the at least one discontinuity or anomaly and respective likelihoods of potential causes of the at least one discontinuity or anomaly;
   executing, by the processor, the neural network using a plurality of second attributes corresponding to a second joining as input, the neural network generating one or more attributes associated with at least one second discontinuity or anomaly of the second joining, each of the one or more attributes identifying a respective likelihood of a respective physical condition of the welding system causing the at least one second discontinuity or anomaly of the second joining; and
   transmitting, by the processor, to a joining machine, an instruction to modify at least one joining parameter of its welding based on the one or more attributes generated by the neural network.

2. The method of claim 1, wherein the plurality of attributes corresponding to previous joinings further comprise at least one of metal sheet compositional attributes, metal sheet geometric attributes, stud compositional attributes, or stud geometric attributes.

3. The method of claim 1, wherein the neural network calculates a depth and a type associated with each discontinuity or anomaly.

4. The method of claim 1, wherein the joining is a stud welding.

5. The method of claim 1, wherein the joining is performed via a rivet welding method.

6. The method of claim 1, further comprising:
   executing, by the processor, a second neural network that receives, as input, the one or more attributes associated with the at least one discontinuity or anomaly generated by the neural network and generates a remedial action associated with the at least one discontinuity or anomaly,
   wherein the second neural network was trained based on one or more attributes associated with at least one previous discontinuity or anomaly corresponding to one or more previous joinings and one or more corresponding remedial actions; and
   presenting, by the processor, for display, the remedial action generated by the second neural network.

7. The method of claim 6, wherein the remedial action generated by the second neural network is a corrective or preventative action.

8. The method of claim 1, further comprising presenting, by the processor, at a user interface, a table displaying, in a column corresponding to the second joining, the respective likelihood of the respective physical condition of the welding system causing the at least one second discontinuity or anomaly for each of the one or more attributes generated by the neural network.

9. The method of claim 1, wherein the at least one joining parameter comprises at least one of a voltage, current, or lift of the joining machine.

10. The method of claim 1, wherein the instruction causes the joining machine to cease welding.

11. The method of claim 1, further comprising:
presenting, by the processor, at a user interface, the one or more attributes associated with at least one discontinuity or anomaly of the second joining; and
training, by the processor, the neural network based on the one or more attributes and input to the user interface.

12. A system for training neural network to predict a likelihood of at least one discontinuity or anomaly being present within a joining created in a welding system, comprising:
a server comprising a processor and a non-transitory computer-readable medium containing instructions that when executed by the processor causes the processor to perform operations comprising:
receiving a plurality of attributes corresponding to the joining;
generating a training dataset based on the plurality of attributes corresponding to the joining and a plurality of attributes corresponding to previous joinings having at least one discontinuity or anomaly, the plurality of attributes corresponding to previous joinings comprising at least a voltage value, a current value, and a lift value for each previous joining, the lift value indicating a distance a weld stud is raised above a base material during the previous joining;
training the neural network using the training dataset, the neural network trained to predict the likelihood of the at least one discontinuity or anomaly and respective likelihoods of potential causes of the at least one discontinuity or anomaly;
executing the neural network using a plurality of second attributes corresponding to a second joining as input, the neural network generating one or more attributes associated with at least one second discontinuity or anomaly of the second joining, each of the one or more attributes identifying a respective likelihood of a respective physical condition of the welding system causing the at least one second discontinuity or anomaly of the second joining; and
transmitting, to a joining machine, an instruction to modify at least one joining parameter of its welding based on the one or more attributes generated by the neural network.

13. The system of claim 12, wherein the plurality of attributes corresponding to previous joinings further comprise at least one of metal sheet compositional attributes, metal sheet geometric attributes, stud compositional attributes, or stud geometric attributes.

14. The system of claim 12, wherein the neural network calculates a depth and a type associated with each discontinuity or anomaly.

15. The system of claim 12, wherein the joining is a stud welding.

16. The system of claim 12, wherein the joining is performed via a rivet welding method.

17. The system of claim 12, wherein the instructions further cause the processor to:
execute a second neural network that receives, as input, the one or more attributes associated with the at least one discontinuity or anomaly generated by the neural network and generates a remedial action associated with the at least one discontinuity or anomaly,
wherein the second neural network was trained based on one or more attributes associated with at least one previous discontinuity or anomaly corresponding to one or more previous joinings and one or more corresponding remedial actions; and
present, for display, the remedial action generated by the second neural network.

18. The system of claim 17, wherein the remedial action generated by the second neural network is a corrective or preventative action.

19. A system for training neural network to predict a likelihood of at least one discontinuity or anomaly being present within a joining created in a welding system, comprising:
a joining machine; and
a processor in communication with the joining machine, the processor configured to:
receive a plurality of attributes corresponding to the joining;
generate a training dataset based on the plurality of attributes corresponding to the joining and a plurality of attributes corresponding to previous joinings having at least one discontinuity or anomaly, the plurality of attributes corresponding to previous joinings comprising at least a voltage value, a current value, and a lift value for each previous joining, the lift value indicating a distance a weld stud is raised above a base material during the previous joining;
train the neural network using the training dataset, the neural network trained to predict the likelihood of the at least one discontinuity or anomaly and respective likelihoods of potential causes of the at least one discontinuity or anomaly;
execute the neural network using a plurality of second attributes corresponding to a second joining as input, the neural network generating one or more attributes associated with at least one second discontinuity or anomaly of the second joining, each of the one or more attributes identifying a respective likelihood of a respective physical condition of the welding system causing the at least one second discontinuity or anomaly of the second joining;
transmit, to the joining machine, an instruction to modify at least one joining parameter of its welding based on the one or more attributes generated by the neural network.

20. The system of claim 19, wherein the processor is further configured to:
execute a second neural network that receives, as input, the one or more attributes associated with the at least one discontinuity or anomaly generated by the neural network and generates a remedial action associated with the at least one discontinuity or anomaly,
wherein the second neural network was trained based on one or more attributes associated with at least one previous discontinuity or anomaly corresponding to one or more previous joinings and one or more corresponding remedial actions; and
present, for display, the remedial action generated by the second neural network.

* * * * *